United States Patent
Su et al.

(10) Patent No.: US 11,151,001 B2
(45) Date of Patent: Oct. 19, 2021

(54) RECOVERY CHECKPOINTS FOR DISTRIBUTED FILE SYSTEMS

(71) Applicant: Qumulo, Inc., Seattle, WA (US)

(72) Inventors: Sihang Su, Vancouver (CA); Kevin David Jamieson, North Vancouver (CA); Michael Anthony Chmiel, Seattle, WA (US)

(73) Assignee: Qumulo, Inc., Seattle, WA (US)

( * ) Notice: Subject to any disclaimer, the term of this patent is extended or adjusted under 35 U.S.C. 154(b) by 0 days.

(21) Appl. No.: 16/775,041

(22) Filed: Jan. 28, 2020

(65) Prior Publication Data

US 2021/0232464 A1  Jul. 29, 2021

(51) Int. Cl.
*G06F 16/00* (2019.01)
*G06F 11/14* (2006.01)
*G06F 16/182* (2019.01)
*G06F 16/178* (2019.01)

(52) U.S. Cl.
CPC ........ *G06F 11/1469* (2013.01); *G06F 16/178* (2019.01); *G06F 16/184* (2019.01); *G06F 2201/84* (2013.01)

(58) Field of Classification Search
None
See application file for complete search history.

(56) References Cited

U.S. PATENT DOCUMENTS

| | | |
|---|---|---|
| 5,165,031 A | 11/1992 | Pruul et al. |
| 5,319,773 A | 6/1994 | Britton et al. |
| 5,410,684 A | 4/1995 | Ainsworth et al. |
| 5,410,719 A | 4/1995 | Shackleford |
| 5,442,561 A | 8/1995 | Yoshizawa et al. |

(Continued)

FOREIGN PATENT DOCUMENTS

| | | |
|---|---|---|
| EP | 1217551 A2 | 6/2002 |
| EP | 1498829 A1 | 1/2005 |

(Continued)

OTHER PUBLICATIONS

Office Communication for U.S. Appl. No. 15/967,499 dated Jun. 27, 2018.

(Continued)

*Primary Examiner* — Debbie M Le
(74) *Attorney, Agent, or Firm* — John W. Branch; Branch Partners PLLC

(57) ABSTRACT

Embodiments are directed to managing data in a file system over a network. A source file system that includes a plurality of objects may be provided. A replication job that copies each object associated with a source replication snapshot to a target file system may be executed. The replication job may be associated with a job identifier. Recovery point information that includes the job identifier, a source snapshot number that corresponds to the source replication snapshot, a target snapshot number that corresponds to a target replication snapshot may be generated. The recovery point information may be stored on the source file system and a copy of the recovery point information may be stored on the target file system. The recovery point information or the copy of the recovery point information may be employed to recover from errors detected during execution of a next replication job.

20 Claims, 20 Drawing Sheets

(56) References Cited

U.S. PATENT DOCUMENTS

| | | | |
|---|---|---|---|
| 5,953,719 A | 9/1999 | Kleewein et al. | |
| 6,236,996 B1 | 5/2001 | Bapat et al. | |
| 6,385,641 B1 | 5/2002 | Jiang et al. | |
| 6,415,283 B1 | 7/2002 | Conklin | |
| 6,496,944 B1 | 12/2002 | Hsiao et al. | |
| 6,560,615 B1 | 5/2003 | Zayas et al. | |
| 6,772,435 B1 | 8/2004 | Thexton et al. | |
| 6,772,735 B2 | 8/2004 | Thexton et al. | |
| 6,874,130 B1 | 3/2005 | Baweja et al. | |
| 6,892,211 B2 | 5/2005 | Hitz et al. | |
| 6,965,903 B1 | 11/2005 | Agarwal et al. | |
| 6,965,936 B1 | 11/2005 | Wipfel et al. | |
| 7,213,040 B1 | 5/2007 | Stokes et al. | |
| 7,594,138 B2* | 9/2009 | Abdulvahid | G06F 11/1469 714/6.1 |
| 7,636,743 B2 | 12/2009 | Erofeev | |
| 7,693,876 B2 | 4/2010 | Hackworth et al. | |
| 7,757,056 B1 | 7/2010 | Fair | |
| 7,844,580 B2 | 11/2010 | Srivastava et al. | |
| 7,933,870 B1 | 4/2011 | Webster | |
| 7,937,421 B2 | 5/2011 | Mikesell et al. | |
| 7,962,709 B2* | 6/2011 | Agrawal | G06F 11/1456 711/162 |
| 7,966,293 B1 | 6/2011 | Owara et al. | |
| 8,027,827 B2 | 9/2011 | Bitar et al. | |
| 8,046,378 B1 | 10/2011 | Zhuge et al. | |
| 8,108,429 B2 | 1/2012 | Sim-Tang et al. | |
| 8,296,312 B1 | 10/2012 | Leung et al. | |
| 8,355,407 B2 | 1/2013 | Wookey et al. | |
| 8,364,648 B1 | 1/2013 | Sim-Tang | |
| 8,423,733 B1 | 4/2013 | Ozdemir | |
| 8,448,170 B2 | 5/2013 | Wipfel et al. | |
| 8,463,825 B1 | 6/2013 | Harty et al. | |
| 8,489,656 B2* | 7/2013 | Erofeev | H04L 29/0854 707/828 |
| 8,504,733 B1 | 8/2013 | Iyer et al. | |
| 8,515,911 B1 | 8/2013 | Zhou et al. | |
| 8,612,404 B2 | 12/2013 | Bone et al. | |
| 8,645,323 B2* | 2/2014 | Jackiewicz | G06F 9/4868 707/624 |
| 8,661,447 B1 | 2/2014 | Olliff et al. | |
| 8,776,050 B2 | 7/2014 | Plouffe et al. | |
| 8,782,655 B2 | 7/2014 | Blanding et al. | |
| 8,806,154 B1 | 8/2014 | Gupta et al. | |
| 8,838,887 B1 | 9/2014 | Burke et al. | |
| 8,838,931 B1 | 9/2014 | Marshak et al. | |
| 8,849,764 B1 | 9/2014 | Long et al. | |
| 8,868,797 B1 | 10/2014 | Kirac et al. | |
| 8,924,364 B1 | 12/2014 | Zhong et al. | |
| 8,972,694 B1 | 3/2015 | Dolan et al. | |
| 9,015,214 B2 | 4/2015 | Nishida et al. | |
| 9,026,765 B1 | 5/2015 | Marshak et al. | |
| 9,047,017 B1 | 6/2015 | Dolan et al. | |
| 9,141,633 B1 | 9/2015 | Li et al. | |
| 9,143,379 B1 | 9/2015 | Berger et al. | |
| 9,158,653 B2 | 10/2015 | Gold | |
| 9,171,145 B2 | 10/2015 | Dash et al. | |
| 9,244,975 B2 | 1/2016 | Das et al. | |
| 9,244,976 B1 | 1/2016 | Zhang et al. | |
| 9,384,252 B2* | 7/2016 | Akirav | G06F 11/1451 |
| 9,501,487 B1 | 11/2016 | Yuan et al. | |
| 9,547,560 B1 | 1/2017 | Lee | |
| 9,600,193 B2* | 3/2017 | Ahrens | G06F 3/0619 |
| 9,747,171 B2* | 8/2017 | Beeken | G06F 11/1469 |
| 9,753,782 B2 | 9/2017 | Fang et al. | |
| 9,753,932 B1 | 9/2017 | Brow et al. | |
| 9,785,377 B2 | 10/2017 | Shin et al. | |
| 10,140,185 B1 | 11/2018 | Lopez et al. | |
| 10,261,868 B2* | 4/2019 | Brown | G06F 11/1448 |
| 10,275,493 B1 | 4/2019 | Mostak | |
| 10,303,561 B2* | 5/2019 | Beeken | G06F 11/1469 |
| 10,318,401 B2 | 6/2019 | Rothschilds et al. | |
| 10,339,101 B1 | 7/2019 | Gupta | |
| 10,423,609 B1 | 9/2019 | Strauss | |
| 10,437,509 B1* | 10/2019 | Alexeev | G06F 3/0659 |
| 10,474,635 B1 | 11/2019 | Unger et al. | |
| 10,534,758 B1 | 1/2020 | Carpenter et al. | |
| 10,678,663 B1 | 6/2020 | Sharma et al. | |
| 10,725,977 B1* | 7/2020 | Chmiel | G06F 16/178 |
| 2001/0039622 A1 | 11/2001 | Hitz et al. | |
| 2002/0065835 A1 | 5/2002 | Fujisaki | |
| 2002/0083073 A1 | 6/2002 | Vaidya et al. | |
| 2002/0099691 A1 | 7/2002 | Lore et al. | |
| 2002/0178271 A1 | 11/2002 | Graham et al. | |
| 2003/0033308 A1 | 2/2003 | Patel et al. | |
| 2003/0145009 A1 | 7/2003 | Forman et al. | |
| 2003/0177379 A1 | 9/2003 | Hori et al. | |
| 2003/0182313 A1 | 9/2003 | Federwisch et al. | |
| 2004/0030727 A1 | 2/2004 | Armangau et al. | |
| 2004/0098425 A1 | 5/2004 | Wiss et al. | |
| 2004/0153479 A1 | 8/2004 | Mikesell et al. | |
| 2004/0255048 A1 | 12/2004 | Lev Ran et al. | |
| 2005/0015674 A1 | 1/2005 | Haugh | |
| 2005/0027748 A1 | 2/2005 | Kisley | |
| 2005/0065986 A1 | 3/2005 | Bixby et al. | |
| 2005/0091663 A1 | 4/2005 | Bagsby | |
| 2005/0114726 A1 | 5/2005 | Ouchi | |
| 2005/0119996 A1 | 6/2005 | Ohata et al. | |
| 2005/0154866 A1 | 7/2005 | Steely, Jr. et al. | |
| 2005/0195660 A1 | 9/2005 | Kavuri et al. | |
| 2005/0223019 A1 | 10/2005 | Das et al. | |
| 2006/0004890 A1 | 1/2006 | Semple et al. | |
| 2006/0053139 A1 | 3/2006 | Marzinski et al. | |
| 2006/0089982 A1 | 4/2006 | Abbott et al. | |
| 2006/0090036 A1 | 4/2006 | Zohar et al. | |
| 2006/0123005 A1 | 6/2006 | Burnett et al. | |
| 2006/0173842 A1 | 8/2006 | Horvitz et al. | |
| 2006/0271604 A1 | 11/2006 | Shoens | |
| 2007/0011302 A1 | 1/2007 | Groner et al. | |
| 2007/0027985 A1 | 2/2007 | Ramany et al. | |
| 2007/0100855 A1 | 5/2007 | Kohl | |
| 2007/0118561 A1 | 5/2007 | Idicula et al. | |
| 2007/0143371 A1 | 6/2007 | Kottomtharayil | |
| 2008/0028006 A1 | 1/2008 | Liu et al. | |
| 2008/0059399 A1 | 3/2008 | DeLorme et al. | |
| 2008/0059541 A1 | 3/2008 | Fachan et al. | |
| 2008/0082593 A1 | 4/2008 | Komarov et al. | |
| 2008/0172366 A1 | 7/2008 | Hannel et al. | |
| 2008/0228772 A1 | 9/2008 | Plamondon | |
| 2008/0250357 A1 | 10/2008 | Lee et al. | |
| 2008/0256474 A1 | 10/2008 | Chakra et al. | |
| 2008/0270469 A1 | 10/2008 | Myerson et al. | |
| 2008/0270928 A1 | 10/2008 | Chakra et al. | |
| 2008/0282244 A1 | 11/2008 | Wu et al. | |
| 2008/0288306 A1 | 11/2008 | MacIntyre et al. | |
| 2008/0301256 A1 | 12/2008 | McWilliams et al. | |
| 2008/0313217 A1 | 12/2008 | Dunsmore et al. | |
| 2009/0077087 A1 | 3/2009 | Urano et al. | |
| 2009/0138500 A1 | 5/2009 | Yuan et al. | |
| 2009/0199190 A1 | 8/2009 | Chen et al. | |
| 2009/0222509 A1 | 9/2009 | King et al. | |
| 2009/0240539 A1 | 9/2009 | Slawson et al. | |
| 2009/0274047 A1 | 11/2009 | Kruys et al. | |
| 2009/0319566 A1 | 12/2009 | Wald et al. | |
| 2010/0036895 A1 | 2/2010 | Boyd et al. | |
| 2010/0088317 A1 | 4/2010 | Bone et al. | |
| 2010/0161557 A1 | 6/2010 | Anderson et al. | |
| 2010/0179959 A1 | 7/2010 | Shoens | |
| 2010/0217948 A1 | 8/2010 | Mason et al. | |
| 2010/0241668 A1 | 8/2010 | Susanto et al. | |
| 2010/0281214 A1 | 11/2010 | Jernigan, IV | |
| 2010/0287512 A1 | 11/2010 | Gan et al. | |
| 2011/0039622 A1 | 2/2011 | Levenson | |
| 2011/0066668 A1 | 3/2011 | Guarraci | |
| 2011/0082836 A1 | 4/2011 | Wang et al. | |
| 2011/0125799 A1 | 5/2011 | Kandasamy et al. | |
| 2011/0125973 A1 | 5/2011 | Lev et al. | |
| 2011/0161381 A1 | 6/2011 | Wang et al. | |
| 2011/0161964 A1 | 6/2011 | Piazza et al. | |
| 2011/0196833 A1 | 8/2011 | Drobychev et al. | |
| 2011/0196899 A1 | 8/2011 | Hughes et al. | |
| 2011/0202925 A1 | 8/2011 | Banerjee et al. | |
| 2011/0246724 A1 | 10/2011 | Marathe et al. | |
| 2012/0036463 A1 | 2/2012 | Krakovsky et al. | |

(56) References Cited

U.S. PATENT DOCUMENTS

| | | |
|---|---|---|
| 2012/0066179 A1 | 3/2012 | Saika |
| 2012/0096059 A1 | 4/2012 | Shimizu et al. |
| 2012/0136843 A1 | 5/2012 | Bone et al. |
| 2012/0151438 A1 | 6/2012 | Bach et al. |
| 2012/0166478 A1 | 6/2012 | Das et al. |
| 2012/0317079 A1 | 12/2012 | Shoens et al. |
| 2013/0019072 A1 | 1/2013 | Strasser et al. |
| 2013/0024609 A1 | 1/2013 | Gorobets et al. |
| 2013/0073819 A1 | 3/2013 | Havewala et al. |
| 2013/0086121 A1 | 4/2013 | Preslan |
| 2013/0091168 A1 | 4/2013 | Bhave et al. |
| 2013/0110787 A1 | 5/2013 | Garimella et al. |
| 2013/0191355 A1 | 7/2013 | Bone et al. |
| 2013/0227236 A1 | 8/2013 | Flynn et al. |
| 2013/0304903 A1 | 11/2013 | Mick et al. |
| 2013/0311454 A1 | 11/2013 | Ezzat |
| 2013/0318194 A1 | 11/2013 | Timbs |
| 2013/0325806 A1 | 12/2013 | Bachar et al. |
| 2013/0339406 A1 | 12/2013 | Kanfi |
| 2014/0006354 A1 | 1/2014 | Parkinson et al. |
| 2014/0040199 A1 | 2/2014 | Golab et al. |
| 2014/0040693 A1 | 2/2014 | Kim et al. |
| 2014/0095249 A1 | 4/2014 | Tarakad et al. |
| 2014/0101389 A1 | 4/2014 | Nellans |
| 2014/0156956 A1 | 6/2014 | Ezra |
| 2014/0181441 A1 | 6/2014 | Kottomtharayil et al. |
| 2014/0237193 A1 | 8/2014 | Shivashankaraiah |
| 2014/0258609 A1 | 9/2014 | Cui et al. |
| 2014/0280485 A1 | 9/2014 | Hummaida et al. |
| 2014/0281307 A1 | 9/2014 | Peterson et al. |
| 2014/0281411 A1 | 9/2014 | Abdallah |
| 2014/0344222 A1 | 11/2014 | Morris et al. |
| 2014/0372384 A1 | 12/2014 | Long et al. |
| 2014/0372607 A1 | 12/2014 | Gladwin et al. |
| 2014/0373032 A1 | 12/2014 | Merry et al. |
| 2015/0006226 A1 | 1/2015 | Smith et al. |
| 2015/0067086 A1 | 3/2015 | Adriaens et al. |
| 2015/0067142 A1 | 3/2015 | Renkema |
| 2015/0106145 A1 | 4/2015 | Hamilton et al. |
| 2015/0135331 A1 | 5/2015 | Das |
| 2015/0149736 A1 | 5/2015 | Kwon et al. |
| 2015/0186529 A1 | 7/2015 | Rope et al. |
| 2015/0193347 A1 | 7/2015 | Kluesing et al. |
| 2015/0215405 A1 | 7/2015 | Baek et al. |
| 2015/0234879 A1 | 8/2015 | Baldwin et al. |
| 2015/0242263 A1 | 8/2015 | Klose |
| 2015/0278282 A1 | 10/2015 | Sardina et al. |
| 2015/0310035 A1 | 10/2015 | Godman et al. |
| 2015/0347126 A1 | 12/2015 | Tibble et al. |
| 2016/0034356 A1 | 2/2016 | Aron et al. |
| 2016/0139836 A1 | 5/2016 | Nallathambi et al. |
| 2016/0147654 A1 | 5/2016 | Zhao et al. |
| 2016/0224430 A1 | 8/2016 | Long et al. |
| 2016/0246816 A1 | 8/2016 | Abiri et al. |
| 2016/0292013 A1 | 10/2016 | Li et al. |
| 2016/0306810 A1 | 10/2016 | Ni et al. |
| 2016/0314046 A1 | 10/2016 | Kumarasamy |
| 2016/0335278 A1* | 11/2016 | Tabaaloute ............ G06F 16/184 |
| 2016/0357677 A1 | 12/2016 | Hooker et al. |
| 2016/0359859 A1 | 12/2016 | Capone |
| 2016/0371297 A1 | 12/2016 | Okun et al. |
| 2016/0380878 A1 | 12/2016 | Bugenhagen et al. |
| 2017/0032006 A1 | 2/2017 | Anglin et al. |
| 2017/0046143 A1 | 2/2017 | Kochhar et al. |
| 2017/0052898 A1 | 2/2017 | Ash et al. |
| 2017/0078164 A1 | 3/2017 | Hildebrand et al. |
| 2017/0091046 A1 | 3/2017 | Bangalore et al. |
| 2017/0123883 A1 | 5/2017 | Hall |
| 2017/0123935 A1 | 5/2017 | Pandit et al. |
| 2017/0163728 A1 | 6/2017 | Chawla et al. |
| 2017/0201582 A1 | 7/2017 | Zhang et al. |
| 2017/0286455 A1 | 10/2017 | Li et al. |
| 2017/0316321 A1 | 11/2017 | Whitney et al. |
| 2017/0336983 A1 | 11/2017 | Roh et al. |
| 2017/0344598 A1 | 11/2017 | Constantinescu et al. |
| 2017/0344905 A1 | 11/2017 | Hack et al. |
| 2018/0040029 A1 | 2/2018 | Zeng et al. |
| 2018/0101546 A1 | 4/2018 | Krasnow et al. |
| 2018/0129443 A1 | 5/2018 | Karve et al. |
| 2018/0288057 A1 | 10/2018 | Varadamma et al. |
| 2018/0314423 A1 | 11/2018 | Gong et al. |
| 2019/0095112 A1 | 3/2019 | Lingarajappa |
| 2019/0102700 A1 | 4/2019 | Babu et al. |
| 2019/0163591 A1* | 5/2019 | Ouyang ................. G06F 11/00 |
| 2019/0384640 A1 | 12/2019 | Swamy et al. |
| 2020/0004977 A1 | 1/2020 | Araujo et al. |
| 2021/0042263 A1 | 2/2021 | Zdornov et al. |
| 2021/0042282 A1 | 2/2021 | Cseri et al. |

FOREIGN PATENT DOCUMENTS

| | | |
|---|---|---|
| WO | 1999044145 A1 | 9/1999 |
| WO | WO0072201 A1 | 11/2000 |
| WO | 2009007250 A2 | 1/2009 |

OTHER PUBLICATIONS

Office Communication for U.S. Appl. No. 16/226,587 dated Feb. 25, 2019.
Office Communication for U.S. Appl. No. 15/473,051 dated Jun. 30, 2017.
Office Communication for U.S. Appl. No. 16/004,182 dated Mar. 5, 2019.
Office Communication for U.S. Appl. No. 16/004,182 dated Aug. 23, 2018.
Office Communication for U.S. Appl. No. 16/004,208 dated Aug. 27, 2018.
European Communication and European Search Report for European Application No. 18155779.4, dated Apr. 17, 2018.
Office Communication for U.S. Appl. No. 16/262,756 dated Aug. 5, 2019.
Office Communication for U.S. Appl. No. 16/262,756 dated Apr. 2, 2019.
Office Communication for U.S. Appl. No. 16/262,756 dated Oct. 25, 2019.
Office Communication for U.S. Appl. No. 16/659,488 dated Dec. 30, 2019.
Office Communication for U.S. Appl. No. 14/595,598 dated Dec. 31, 2019.
Office Communication for U.S. Appl. No. 16/228,716 dated Jun. 24, 2019.
Office Communication for U.S. Appl. No. 16/231,354 dated Jul. 10, 2019.
Office Communication for U.S. Appl. No. 16/226,587 dated Aug. 5, 2019.
Office Communication for U.S. Appl. No. 16/228,716 dated Feb. 28, 2019.
Office Communication for U.S. Appl. No. 16/231,354 dated Mar. 25, 2019.
Office Communication for U.S. Appl. No. 16/262,790 dated Aug. 23, 2019.
Office Communication for U.S. Appl. No. 16/262,790 dated Apr. 18, 2019.
Office Communication for U.S. Appl. No. 16/234,395 dated Aug. 8, 2019.
Office Communication for U.S. Appl. No. 16/234,334 dated Apr. 5, 2019.
Office Communication for U.S. Appl. No. 16/234,395 dated Mar. 28, 2019.
Office Communication for U.S. Appl. No. 16/234,334 dated Oct. 11, 2019.
Official Communication for U.S. Appl. No. 15/473,051 dated Jun. 30, 2017.
European Communication and European Search Report for European Application No. 18155779.4.
Official Communication for U.S. Appl. No. 15/694,604 dated Jun. 3, 2019.

(56) References Cited

OTHER PUBLICATIONS

Official Communication for U.S. Appl. No. 16/004,182 dated Aug. 23, 2018.
Official Communication for U.S. Appl. No. 16/004,182 dated Mar. 5, 2019.
Official Communication for U.S. Appl. No. 16/004,182 dated Jul. 3, 2019.
Official Communication for U.S. Appl. No. 16/004,182 dated May 22, 2019.
Official Communication for U.S. Appl. No. 16/004,182 dated Jan. 7, 2020.
Official Communication for U.S. Appl. No. 14/595,043 dated May 4, 2017.
Official Communication for U.S. Appl. No. 14/595,043 dated Feb. 23, 2018.
Official Communication for U.S. Appl. No. 14/595,043 dated May 25, 2018.
Official Communication for U.S. Appl. No. 14/595,043 dated Oct. 5, 2018.
Official Communication for U.S. Appl. No. 14/595,043 dated Jun. 7, 2019.
Official Communication for U.S. Appl. No. 14/595,043 dated Aug. 27, 2019.
Official Communication for U.S. Appl. No. 14/658,015 dated Apr. 27, 2017.
Official Communication for U.S. Appl. No. 14/658,015 dated Jan. 4, 2018.
Official Communication for U.S. Appl. No. 14/658,015 dated Jul. 13, 2018.
Official Communication for U.S. Appl. No. 14/859,061 dated Sep. 22, 2017.
Official Communication for U.S. Appl. No. 15/831,236 dated Mar. 30, 2018.
Official Communication for U.S. Appl. No. 15/831,236 dated Aug. 15, 2018.
Official Communication for U.S. Appl. No. 14/859,114 dated Jul. 24, 2017.
Official Communication for U.S. Appl. No. 14/859,114 dated Feb. 21, 2018.
Official Communication for U.S. Appl. No. 14/859,114 dated May 11, 2018.
Office Communication for U.S. Appl. No. 15/694,604 dated Nov. 20, 2019.
Office Communication for U.S. Appl. No. 14/859,114 dated Jun. 27, 2018.
Office Communication for U.S. Appl. No. 14/859,114 dated Nov. 19, 2018.
Office Communication for U.S. Appl. No. 14/859,114 dated Jan. 31, 2019.
Office Communication for U.S. Appl. No. 14/859,114 dated Mar. 7, 2019.
Office Communication for U.S. Appl. No. 14/859,114 dated Sep. 13, 2019.
Office Communication for U.S. Appl. No. 14/859,114 dated Nov. 26, 2019.
Office Communication for U.S. Appl. No. 15/288,853 dated Sep. 19, 2018.
Office Communication for U.S. Appl. No. 15/288,853 dated Mar. 25, 2019.
Office Communication for U.S. Appl. No. 16/436,825 dated Jul. 11, 2019.
Office Communication for U.S. Appl. No. 15/474,047 dated Sep. 18, 2017.
Office Communication for U.S. Appl. No. 15/474,047 dated Mar. 9, 2018.
Office Communication for U.S. Appl. No. 15/474,047 dated Jun. 11, 2018.
Office Communication for U.S. Appl. No. 15/474,047 dated Aug. 15, 2018.
Office Communication for U.S. Appl. No. 15/957,809 dated Jun. 28, 2018.
Office Communication for U.S. Appl. No. 15/957,809 dated Jan. 24, 2019.
Office Communication for U.S. Appl. No. 16/434,157 dated Jul. 25, 2019.
Office Communication for U.S. Appl. No. 15/854,447 dated May 6, 2019.
Office Communication for U.S. Appl. No. 16/505,562 dated Aug. 30, 2019.
European Communication and European Search Report for European Application No. 17206518.7 dated Apr. 5, 2018.
Office Communication for U.S. Appl. No. 16/125,573 dated Nov. 21, 2019.
Office Communication for U.S. Appl. No. 16/226,587 dated Oct. 24, 2019.
Office Communication for U.S. Appl. No. 16/262,756 dated Jan. 28, 2020.
Office Communication for U.S. Appl. No. 16/434,157 dated Jan. 29, 2020.
Office Communication for U.S. Appl. No. 15/967,499 dated Jun. 27, 2018, pp. 1-25.
Office Communication for U.S. Appl. No. 16/226,587 dated Feb. 25, 2019, pp. 1-65.
Office Communication for U.S. Appl. No. 15/473,051 dated Jun. 30, 2017, pp. 1-22.
Office Communication for U.S. Appl. No. 16/004,182 dated Mar. 5, 2019, pp. 1-46.
Office Communication for U.S. Appl. No. 16/004,182 dated Aug. 23, 2018, pp. 1-46.
Office Communication for U.S. Appl. No. 16/004,208 dated Aug. 27, 2018, pp. 1-11.
European Communication and European Search Report for European Application No. 18155779.4, dated Apr. 17, 2018, pp. 1-15.
Office Communication for U.S. Appl. No. 16/262,756 dated Aug. 5, 2019, pp. 1-48.
Office Communication for U.S. Appl. No. 16/262,756 dated Apr. 2, 2019, pp. 1-40.
Office Communication for U.S. Appl. No. 16/262,756 dated Oct. 25, 2019, pp. 1-6.
Office Communication for U.S. Appl. No. 16/659,488 dated Dec. 30, 2019, pp. 1-35.
Office Communication for U.S. Appl. No. 14/595,598 dated Dec. 31, 2019, pp. 1-23.
Office Communication for U.S. Appl. No. 16/228,716 dated Jun. 24, 2019, pp. 1-28.
Office Communication for U.S. Appl. No. 16/231,354 dated Jul. 10, 2019, pp. 1-19.
Office Communication for U.S. Appl. No. 16/226,587 dated Aug. 5, 2019, pp. 1-55.
Office Communication for U.S. Appl. No. 16/228,716 dated Feb. 28, 2019, pp. 1-27.
Office Communication for U.S. Appl. No. 16/231,354 dated Mar. 25, 2019, pp. 1-19.
Office Communication for U.S. Appl. No. 16/262,790 dated Aug. 23, 2019, pp. 1-20.
Office Communication for U.S. Appl. No. 16/262,790 dated Apr. 18, 2019, pp. 1-24.
Office Communication for U.S. Appl. No. 16/234,395 dated Aug. 8, 2019, pp. 1-28.
Office Communication for U.S. Appl. No. 16/234,334 dated Apr. 5, 2019, pp. 1-24.
Office Communication for U.S. Appl. No. 16/234,395 dated Mar. 28, 2019, pp. 1-36.
Kappes et al. "Virtualization-aware Access Control for Multitenant Filesystems", University of Ioannina, Greece, Technical Report No. DCS2013-1, 8, 61-64. (Year: 2013), pp. 1-6.
Hitz et al. "Merging NT and UNIX filesystem permissions", In Proceedings of the 2nd conference on USENIX Windows NT Symposium—vol. 2 (pp. 10-10). USENIX Association. (Aug. 1998), pp. 1-10.
Office Communication for U.S. Appl. No. 16/234,334 dated Oct. 11, 2019, pp. 1-22.

(56) References Cited

OTHER PUBLICATIONS

Official Communication for U.S. Appl. No. 15/473,051 dated Jun. 30, 2017, pp. 1-23.
Official Communication for U.S. Appl. No. 15/694,604 dated Jun. 3, 2019, pp. 1-14.
Official Communication for U.S. Appl. No. 16/004,182 dated Aug. 23, 2018, pp. 1-46.
Official Communication for U.S. Appl. No. 16/004,182 dated Mar. 5, 2019, pp. 1-46.
Official Communication for U.S. Appl. No. 16/004,182 dated Jul. 3, 2019, pp. 1-50.
Official Communication for U.S. Appl. No. 16/004,182 dated May 22, 2019, pp. 1-6.
Official Communication for U.S. Appl. No. 16/004,182 dated Jan. 7, 2020, pp. 1-54.
Official Communication for U.S. Appl. No. 14/595,043 dated May 4, 2017, pp. 1-38.
Official Communication for U.S. Appl. No. 14/595,043 dated Feb. 23, 2018, pp. 1-22.
Official Communication for U.S. Appl. No. 14/595,043 dated May 25, 2018, pp. 1-14.
Official Communication for U.S. Appl. No. 14/595,043 dated Oct. 5, 2018, pp. 1-26.
Official Communication for U.S. Appl. No. 14/595,043 dated Jun. 7, 2019, pp. 1-29.
Official Communication for U.S. Appl. No. 14/595,043 dated Aug. 27, 2019, pp. 1-34.
Official Communication for U.S. Appl. No. 14/658,015 dated Apr. 27, 2017, pp. 1-8.
Official Communication for U.S. Appl. No. 14/658,015 dated Jan. 4, 2018, pp. 1-35.
Official Communication for U.S. Appl. No. 14/658,015 dated Jul. 13, 2018, pp. 1-18.
Official Communication for U.S. Appl. No. 14/859,061 dated Sep. 22, 2017, pp. 1-29.
Official Communication for U.S. Appl. No. 15/831,236 dated Mar. 30, 2018, pp. 1-8.
Official Communication for U.S. Appl. No. 15/831,236 dated Aug. 15, 2018, pp. 1-27.
Official Communication for U.S. Appl. No. 14/859,114 dated Jul. 24, 2017, pp. 1-165.
Official Communication for U.S. Appl. No. 14/859,114 dated Feb. 21, 2018, pp. 1-27.
Official Communication for U.S. Appl. No. 14/859,114 dated May 11, 2018, pp. 1-7.
Office Communication for U.S. Appl. No. 15/694,604 dated Nov. 20, 2019, pp. 1-24.
Office Communication for U.S. Appl. No. 14/859,114 dated Jun. 27, 2018, pp. 1-40.
Office Communication for U.S. Appl. No. 14/859,114 dated Nov. 19, 2018, pp. 1-41.
Office Communication for U.S. Appl. No. 14/859,114 dated Jan. 31, 2019, pp. 1-5.
Office Communication for U.S. Appl. No. 14/859,114 dated Mar. 7, 2019, pp. 1-39.
Office Communication for U.S. Appl. No. 14/859,114 dated Sep. 13, 2019, pp. 1-8.
Office Communication for U.S. Appl. No. 14/859,114 dated Nov. 26, 2019, pp. 1-43.
Office Communication for U.S. Appl. No. 15/288,853 dated Sep. 19, 2018, pp. 1-27.
Chimera, "Value Bars: An Information Visualization and Navigation Tool for Multi-attribute Listings", CHI '92, Monterey, CA, May 3-7, 1992, pp. 293-294.
Office Communication for U.S. Appl. No. 15/288,853 dated Mar. 25, 2019, pp. 1-25.
Cudre-Mauroux, et al., "TrajStore: An Adaptive Storage System for Very Large Trajectory Sets", ICDE 2010, Long Beach, CA, Mar. 1-6, 2010, pp. 109-120.
Office Communication for U.S. Appl. No. 16/436,825 dated Jul. 11, 2019, pp. 1-22.
Office Communication for U.S. Appl. No. 15/474,047 dated Sep. 18, 2017, p. 1-24.
Office Communication for U.S. Appl. No. 15/474,047 dated Mar. 9, 2018, pp. 1-12.
Office Communication for U.S. Appl. No. 15/474,047 dated Jun. 11, 2018, pp. 1-7.
Office Communication for U.S. Appl. No. 15/474,047 dated Aug. 15, 2018, pp. 1-24.
Office Communication for U.S. Appl. No. 15/957,809 dated Jun. 28, 2018, pp. 1-42.
Office Communication for U.S. Appl. No. 15/957,809 dated Jan. 24, 2019, pp. 1-24.
Office Communication for U.S. Appl. No. 16/434,157 dated Jul. 25, 2019, pp. 1-16.
Office Communication for U.S. Appl. No. 15/854,447 dated May 6, 2019, pp. 1-31.
Office Communication for U.S. Appl. No. 16/505,562 dated Aug. 30, 2019, pp. 1-46.
European Communication and European Search Report for European Application No. 17206518.7 dated Apr. 5, 2018, pp. 1-8.
Karatza et al. Epoch load sharing in a network of workstations, Simulation Symposium, 2001. Proceedings. 34th Annual Apr. 22-26, 2001, Piscataway, NJ, USA, IEEE, Apr. 22, 2001 (Apr. 22, 2001), pp. 36-42, XP010541274, ISBN: 978-0-7695-1092-7.
Office Communication for U.S. Appl. No. 16/125,573 dated Nov. 21, 2019, pp. 1-24.
Office Communication for U.S. Appl. No. 16/226,587 dated Oct. 24, 2019, pp. 1-6.
Office Communication for U.S. Appl. No. 16/234,334 dated Jan. 16, 2020, pp. 1-8.
Office Communication for U.S. Appl. No. 16/262,756 dated Jan. 28, 2020, pp. 1-27.
Office Communication for U.S. Appl. No. 16/434,157 dated Jan. 29, 2020, pp. 1-12.
Office Communication for U.S. Appl. No. 16/262,790 dated Feb. 6, 2020, pp. 1-8.
Office Communication for U.S. Appl. No. 14/859,114 dated Mar. 13, 2020, pp. 1-22.
Office Communication for U.S. Appl. No. 16/752,451 dated Mar. 12, 2020, pp. 1-14.
Office Communication for U.S. Appl. No. 16/779,362 dated Mar. 26, 2020, pp. 1-10.
Wikipedia clustered file system page from date Jul. 9, 2019, retrieved using the WayBackMachine, From https://web.archive.org/web/20190709083400/https://en.wikipedia.org/wiki/Clustered_file_system (Year: 2019), pp. 1-6.
Wikipedia raft page from date Jul. 16, 2019, retrieved using the WayBackMachine, from https://web.archive.org/web/20190716115001/https://en.wikipedia.org/wiki/Raft (computer_science) (Year: 2019), pp. 1-4.
Office Communication for U.S. Appl. No. 16/004,182 dated Mar. 23, 2020, pp. 1-6.
Office Communication for U.S. Appl. No. 16/752,509 dated Apr. 2, 2020, pp. 1-42.
Office Communication for U.S. Appl. No. 16/152,277 dated Apr. 3, 2020, pp. 1-10.
Office Communication for U.S. Appl. No. 16/004,182 dated Apr. 28, 2020, pp. 1-52.
Office Communication for U.S. Appl. No. 16/152,259 dated Apr. 29, 2020, pp. 1-19.
Office Communication for U.S. Appl. No. 14/859,114 dated Jun. 5, 2020, pp. 1-6.
Office Communication for U.S. Appl. No. 16/262,756 dated Jun. 8, 2020, pp. 1-43.
Office Communication for U.S. Appl. No. 14/595,598 dated Jul. 9, 2020, pp. 1-26.
Office Communication for U.S. Appl. No. 16/752,451 dated Jul. 23, 2020, pp. 1-31.
Office Communication for U.S. Appl. No. 14/859,114 dated Jul. 23, 2020, pp. 1-28.

(56) References Cited

OTHER PUBLICATIONS

Office Communication for U.S. Appl. No. 16/152,615 dated Aug. 6, 2020, pp. 1-18.
Office Communication for U.S. Appl. No. 16/779,362 dated Aug. 7, 2020, pp. 1-33.
Office Communication for U.S. Appl. No. 16/883,922 dated Aug. 7, 2020, pp. 1-18.
Office Communication for U.S. Appl. No. 16/883,879 dated Sep. 1, 2020, pp. 1-18.
Extended European Search Report for European Patent Application No. 16812585.4 dated Nov. 7, 2018, pp. 1-9.
Comer, Douglas, "The Ubiquitous B-Tree," Computing Surveys, vol. 11, No. 2, Jun. 1979. Computer Science Department, Purdue University, West Lafayette, Indiana 47907, pp. 121-137.
Office Communication for European Patent Application No. 16812585.4 dated Jan. 2, 2020, pp. 1-6.
International Search Report and Written Opinion for Application No. PCT/US2016/38242 dated Oct. 11, 2016, pp. 1-11.
Office Communication for U.S. Appl. No. 14/595,598 dated Jul. 31, 2019, pp. 1-5.
Office Communication for U.S. Appl. No. 14/595,598 dated Sep. 20, 2018, pp. 1-18.
Office Communication for U.S. Appl. No. 14/595,598 dated Dec. 15, 2017, pp. 1-18.
Office Communication for U.S. Appl. No. 14/595,598 dated Feb. 24, 2017, pp. 1-8.
Office Communication for U.S. Appl. No. 14/595,598 dated Apr. 19, 2018, pp. 1-3.
Bloom, Burton H. "Space/Time Trade-offs in Hash Coding with Allowable Errors," Communications of the ACM, vol. 13, No. 7, Jul. 1970. Computer Usage Company, Newton Upper Falls, Massachusettes, pp. 422-426.
Office Communication for U.S. Appl. No. 16/262,756 dated Aug. 24, 2020, pp. 1-21.
Office Communication for European Patent Application No. 18155779.4 dated Oct. 8, 2019, pp. 1-4.
Office Communication for U.S. Appl. No. 16/152,259 dated Aug. 28, 2020, pp. 1-5.
Office Communication for U.S. Appl. No. 16/752,509 dated Aug. 11, 2020, pp. 1-7.
Office Communication for U.S. Appl. No. 14/595,598 dated Sep. 25, 2020, pp. 1-7.
Office Communication for U.S. Appl. No. 16/152,277 dated Oct. 16, 2020, pp. 1-10.
Office Communication for U.S. Appl. No. 16/152,615 dated Oct. 20, 2020, pp. 1-7.
Office Communication for U.S. Appl. No. 16/004,182 dated Nov. 30, 2020, pp. 1-55.
Office Communication for U.S. Appl. No. 14/859,114 dated Dec. 1, 2020, pp. 1-24.
Office Communication for U.S. Appl. No. 16/883,922 dated Dec. 2, 2020, pp. 1-9.
Office Communication for U.S. Appl. No. 16/883,879 dated Dec. 8, 2020, pp. 1-5.
Office Communication for U.S. Appl. No. 17/062,500 dated Nov. 12, 2020, pp. 1-12.
Office Communication for U.S. Appl. No. 17/062,500 dated May 18, 2021, pp. 1-4.
Office Communication for U.S. Appl. No. 17/203,371 dated May 20, 2021, pp. 1-10.
Office Communication for U.S. Appl. No. 17/115,529 dated May 25, 2021, pp. 1-18.
Office Communication for U.S. Appl. No. 14/859,114 dated May 26, 2021, pp. 1-11.
Office Communication for U.S. Appl. No. 16/262,756 dated May 27, 2021, pp. 1-7.
Office Communication for U.S. Appl. No. 17/114,384 dated May 27, 2021, pp. 1-13.
Office Communication for U.S. Appl. No. 17/190,653 dated May 27, 2021, pp. 1-11.
Office Communication for U.S. Appl. No. 16/741,567 dated Jun. 8, 2021, pp. 1-5.
Examination Report for European Patent Application No. 17206518.7 dated Feb. 23, 2021, pp. 1-6.
Office Communication for U.S. Appl. No. 14/859,114 dated Mar. 8, 2021, pp. 1-4.
Office Communication for U.S. Appl. No. 16/004,182 dated Mar. 8, 2021, pp. 1-60.
Office Communication for U.S. Appl. No. 17/062,500 dated Mar. 9, 2021, pp. 1-17.
Office Communication for U.S. Appl. No. 16/152,277 dated Mar. 18, 2021, pp. 1-10.
Office Communication for U.S. Appl. No. 17/160,698 dated Mar. 18, 2021, pp. 1-11.
Office Communication for U.S. Appl. No. 16/152,277 dated Dec. 28, 2020, pp. 1-5.
Office Communication for U.S. Appl. No. 16/004,182 dated Jan. 28, 2021, pp. 1-4.
Office Communication for U.S. Appl. No. 14/595,598 dated Feb. 4, 2021, pp. 1-19.
Office Communication for U.S. Appl. No. 17/115,529 dated Feb. 8, 2021, pp. 1-15.
Office Communication for U.S. Appl. No. 16/262,756 dated Feb. 10, 2021, pp. 1-19.
Office Communication for U.S. Appl. No. 17/114,384 dated Feb. 17, 2021, pp. 1-12.

* cited by examiner

US 11,151,001 B2

RECOVERY CHECKPOINTS FOR DISTRIBUTED FILE SYSTEMS

TECHNICAL FIELD

The present invention relates generally to file systems, and more particularly, but not exclusively, to managing file system recovery in a distributed file system environment.

BACKGROUND

Modern computing often requires the collection, processing, or storage of very large data sets or file systems. Accordingly, to accommodate the capacity requirements as well as other requirements, such as, high availability, redundancy, latency/access considerations, or the like, modern file systems may be very large or distributed across multiple hosts, networks, or data centers, and so on. File systems may require various backup or restore operations. Naïve backup strategies may cause significant storage or performance overhead. For example, in some cases, the size or distributed nature of a modern hyper-scale file systems may make it difficult to determine the objects that need to be replicated. Also, the large number of files in modern distributed file system may make managing state or protection information difficult because of the resources that may be required to visit the files to manage state or protection information for files. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
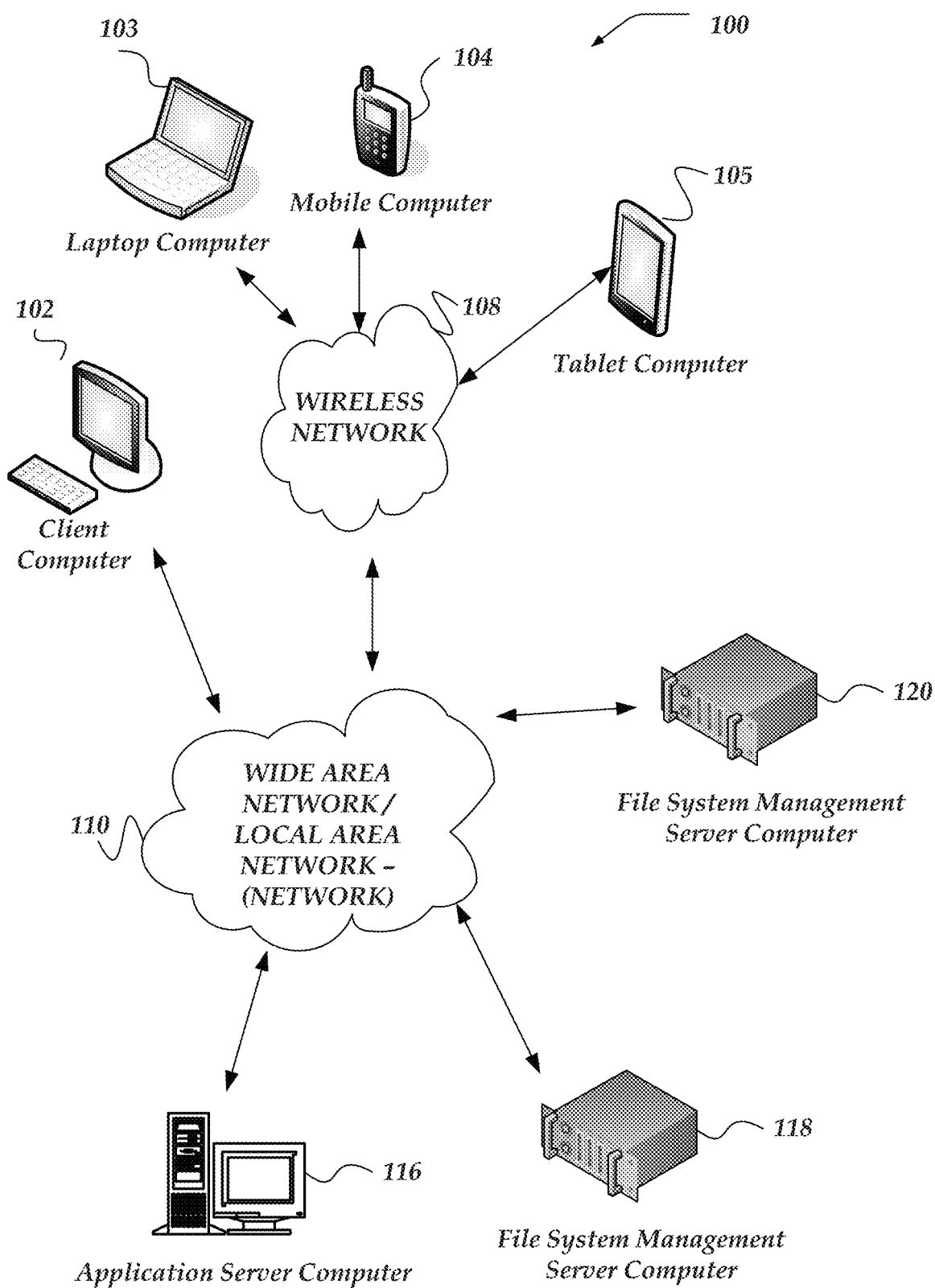
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C #, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the terms "file system object," or "object" refer to entities stored in a file system. These may include files, directories, or the like. In this document for brevity and clarity all objects stored in a file system may be referred to as file system objects.

As used herein the terms "block," or "file system object block" refer to the file system data objects that comprise a file system object. For example, small sized file system objects, such as, directory objects or small files may be comprised of a single block. Whereas, larger file system objects, such as large document files may be comprised of many blocks. Blocks usually are arranged to have a fixed size to simplify the management of a file system. This may include fixing blocks to a particular size based on requirements associated with underlying storage hardware, such as, solid state drives (SSDs) or hard disk drives (HDDs), or the like. However, file system objects, such as, files may be of various sizes, comprised of the number of blocks necessary to represent or contain the entire file system object.

As used herein the terms "epoch," or "file system epoch" refer to time periods in the life of a file system. Epochs may be generated sequentially such that epoch 1 comes before epoch 2 in time. Prior epochs are bounded in the sense that they have a defined beginning and end. The current epoch has a beginning but not an end because it is still running. Epochs may be used to track the birth and death of file system objects, or the like.

As used herein the term "snapshot" refers to a point time version of the file system or a portion of the file system. Snapshots preserve the version of the file system objects at the time the snapshot was taken. Snapshots may be sequentially labeled such that snapshot 1 is the first snapshot taken in a file system and snapshot 2 is the second snapshot, and so on. The sequential labeling may be file system-wide even though snapshots may cover the same or different portions of the file system. Snapshots demark the end of the current file system epoch and the beginning of the next file system epoch. Accordingly, in some embodiments, if a file system is arranged to number epochs and snapshots sequentially, the epoch value or its number label may be assumed to be greater than the number label of the newest snapshot. Epoch boundaries may be formed when a snapshot is taken. The epoch (e.g., epoch count value) is incremented if a snapshot is created. Each epoch boundary is created when a snapshot was created. In some case, if a new snapshot is created, it may be assigned a number label that has the same as the epoch it is closing and thus be one less than the new current epoch that begins running when the new snapshot is taken.

As used herein the terms "mirror relationship," or "mirroring relationship" refer to two file systems that are arranged such that one of the file systems is periodically backed up to the other. The file system that is being backed (e.g., the mirrored file system) is the source file system. The file system that is receiving the backed up objects from the source file system is the target file system.

As used herein the term "replication snapshot" refers to a snapshot that is generated for a replication job. Replication snapshots are regular snapshots that are associated with a failed or completed replication job. Similarly, replication snapshot numbers are the snapshot numbers associated with a replication snapshot.

As used herein the term "configuration information" refers to information that may include rule based policies, pattern matching, scripts (e.g., computer readable instructions), or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing data in a file system over a network. In one or more of the various embodiments, a source file system that includes a plurality of objects may be provided.

In one or more of the various embodiments, a replication job that copies each object associated with a source replication snapshot to a target file system may be executed. The replication job may be associated with a job identifier.

In one or more of the various embodiments, recovery point information that includes the job identifier, a source snapshot number that corresponds to the source replication snapshot, a target snapshot number that corresponds to a target replication snapshot, or the like, may be generated.

In one or more of the various embodiments, the recovery point information may be stored. The recovery point information may be stored on the source file system and a copy of the recovery point information may be stored on the target file system. The recovery point information or the copy of the recovery point information may be employed to recover from one or more errors detected for one or more of the source file system or the target file system during execution of a next replication job.

In one or more of the various embodiments, the next replication job may be executed to copy one or more objects from the source file system to the target file system.

In one or more of the various embodiments, in response to the one or more errors being associated with the target file system, the next replication job may be aborted.

And, in one or more of the various embodiments, in response to a resolution of the one or more errors associated with the target file system, further actions may be performed, including: providing the recovery point information based on a next job identifier associated with a previous replication job; determining a recovery source snapshot number based on the source snapshot number included in the recovery point information; determining a recovery target snapshot number based on the target snapshot number included in the recovery point information; determining one or more recovery objects based on the recovery source snapshot number and the recovery target snapshot number; and copying the one or more recovery objects from the source file system to the target file system.

In one or more of the various embodiments, a snapshot number that is associated an epoch of the source file system may be generated. In one or more of the various embodiments, each object of the plurality of object that is modified during the epoch may be associated with the snapshot number. And, in one or more of the various embodiments, the snapshot number may be employed to provide the source replication snapshot.

In one or more of the various embodiments, a snapshot number that is associated an epoch of the target file system may be generated. In one or more of the various embodiments, the snapshot number may be employed to provide the source replication snapshot. In some embodiments, each object that is copied to the target file system may be associated with the snapshot number. And, in one or more of the various embodiments, the snapshot number may be employed to provide the target replication snapshot.

In one or more of the various embodiments, the source replication snapshot may be generated based on another snapshot that may be on the source file system. A snapshot number associated with the other snapshot may be employed as a source replication snapshot number.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, application server computer 116, file system management server computer 118, file system management server computer 120, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, file system management server computer 118, file system management server computer 120, or other computers.

Client computers 102-105 may further be configured to include a client application that enables an end-user to log into an end-user account that may be managed by another computer, such as application server computer 116, file system management server computer 118, file system management server computer 120, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by application server computer 116, file system management server computer 118, file system management server computer 120.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, file system management server computer 118, file system management server computer 120, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of file system management server computer 118 or file system management server computer 120 are described in more detail below in conjunction with FIG. 3. Although FIG. 1 illustrates file system management server computer 118 or file system management server computer 120, or the like, each as a single computer, the innovations or embodiments are not so limited. For example, one or more functions of file system management server computer 118 or file system management server computer 120, or the like, may be distributed across one or more distinct network computers. Moreover, in one or more embodiments, file system management server computer 118 or file system management server computer 120 may be implemented using a plurality of network computers. Further, in one or more of the various embodiments, file system management server computer 118 or file system management server computer 120, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
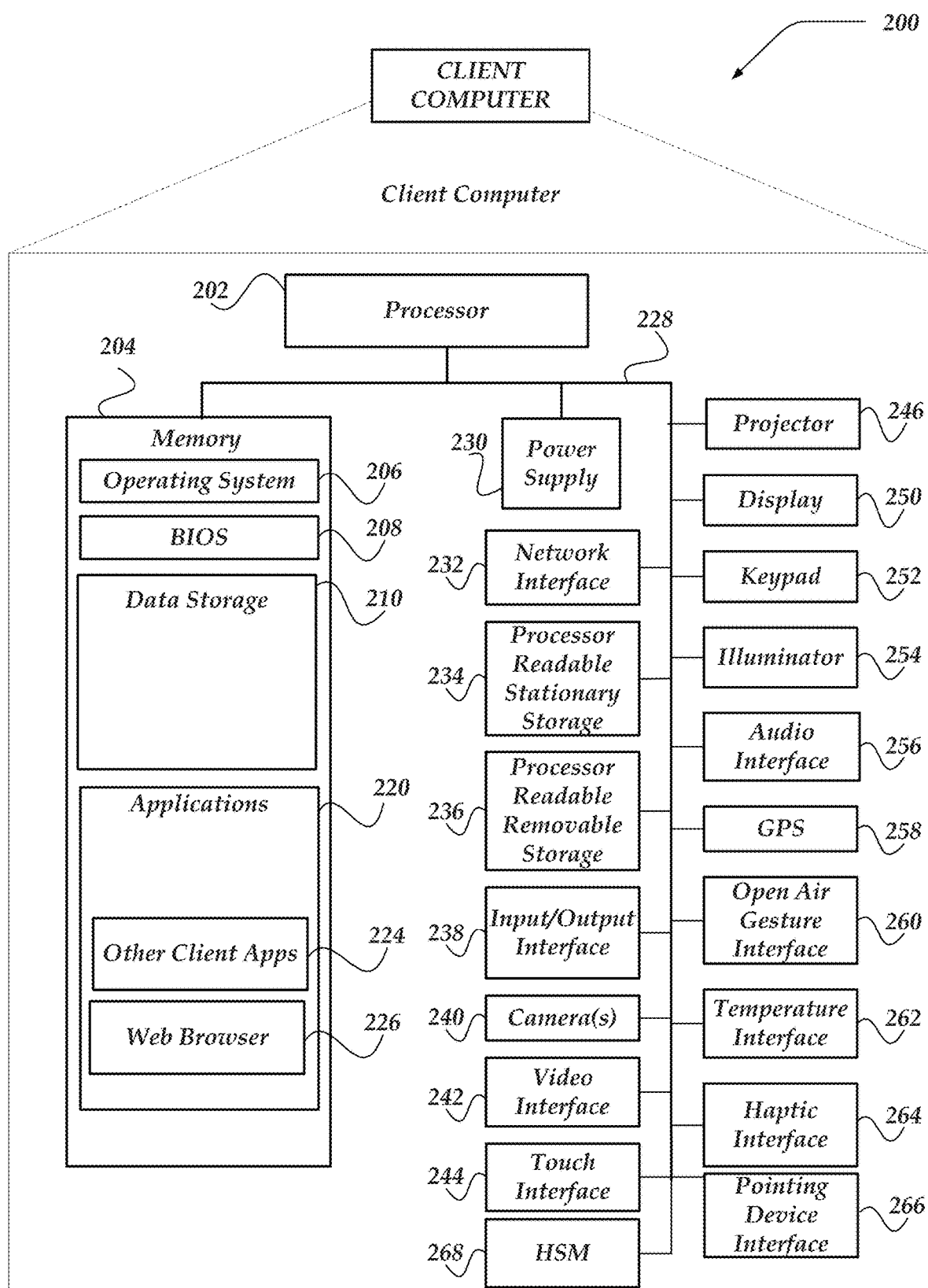
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back-light the buttons on keypad 252 and stay on while the client computer is powered. Also, illuminator 254 may back-light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in display objects, data models, data objects, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, client user interface engine 222, other client applications 224, web browser 226, or the like. Client computers may be arranged to exchange communications one or more servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, visualization applications, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
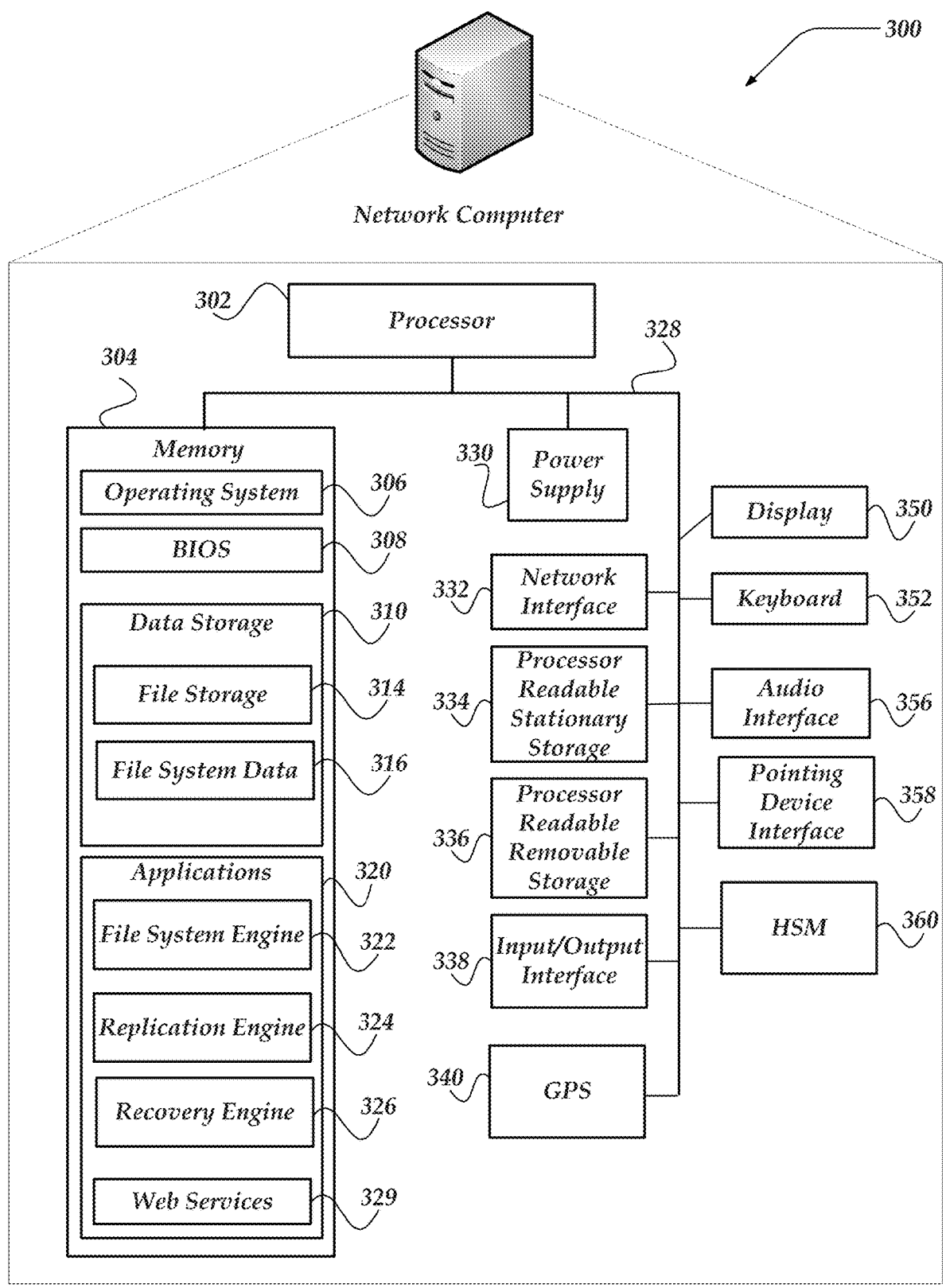
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one or more embodiments of a file system management server computer such as file system management server computer 118, or the like, of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, file system engine 322, replication engine 324, recovery engine 326, web services 329, or the like, may be arranged to employ geo-location information to select one or more localization features, such as, time zones, languages, currencies, currency formatting, calendar formatting, or the like. Localization features may be used in user interfaces, dashboards, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX, or a specialized operating system such as Microsoft Corporation's Windows® operating system, or the Apple Corporation's OSX® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, friend lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, file storage 314, file system data 316, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include file system engine 322, replication engine 324, recovery engine 326, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, file system engine 322, replication engine 324, recovery engine 326, web services 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to file system engine 322, replication engine 324, recovery engine 326, web services 329, or the like, may be provisioned and de-commissioned automatically.

Also, in one or more of the various embodiments, file system engine 322, replication engine 324, recovery engine 326, web services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
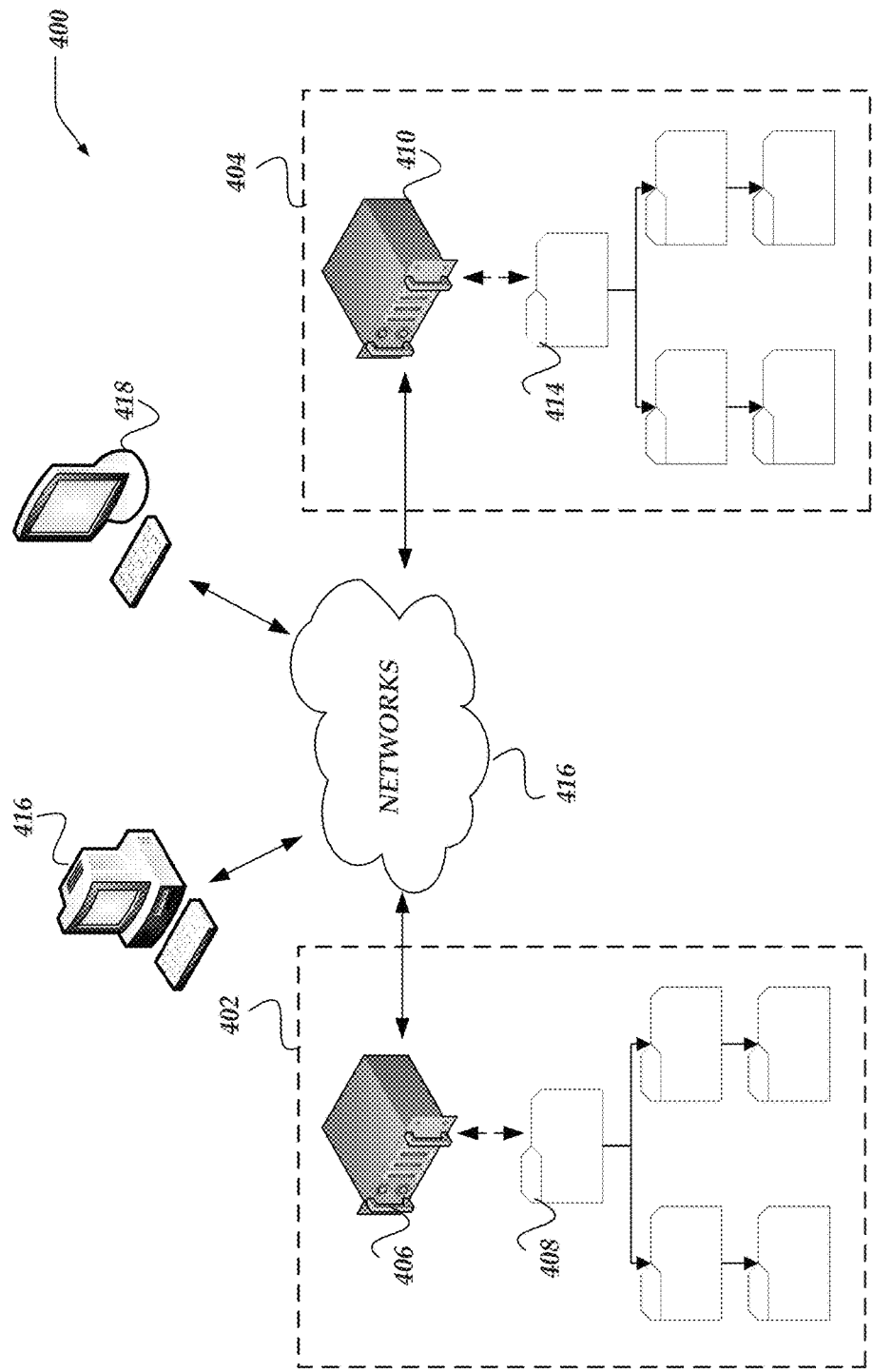
FIG. 4 illustrates a logical architecture of system for managing file system state during replication jobs in accordance with one or more of the various embodiments.

FIG. 4 illustrates a logical architecture of system 400 for recovery checkpoints for distributed file systems in accordance with one or more of the various embodiments. In one or more of the various embodiments, two or more file systems, such as, file system 402 and file system 404 may be arranged to be communicatively coupled to one or more networks, such as, networks 416. Accordingly, in one or more of the various embodiments, one or more clients, such as, client computer 416 and client computer 418 may be arranged to access file system 402 or file system 404 over networks 416. In some embodiments, clients of file system 402 or file system 404 may include users, services, programs, computers, devices, or the like, that may be enabled to perform one or more file system operations, such as, creating, reading, updating, or deleting data (e.g., file system objects) that may be stored in file system 402 or file system 404. In some embodiments, file system 402 or file system 404 may comprise one or more file system management computers, such as file system management computer 406 or file system management computer 410. Also, in one or more of the various embodiments, file systems, such as file system 402 or file system 404 may include one or more file system objects, such as file system object 408 or file system object 414. file system object 412 or file system object 414 may represent the various objects or entities that may be stored in file system 402 or file system 404. In some embodiments, file system objects may include, files, documents, directories, folders, change records, backups, snapshots, replication snapshots, replication information, versions, branches, recovery points, or the like.

In one or more of the various embodiments, the implementation details that enable file system 402 or file system 404 to operate may be hidden from clients, such that they may be arranged to use file system 402 or file system 404 the same way they use other conventional file systems, including local file systems. Accordingly, in one or more of the various embodiments, clients may be unaware that they are using a distributed file system that supports replicating file objects to other file systems because file system engines or replication engines may be arranged to mimic the interface or behavior of one or more standard file systems.

Also, while file system 402 and file system 404 are illustrated as using one file system management computer each with one set of file system objects, the innovations are not so limited. Innovations herein contemplate file systems that include one or more file system management computers or one or more file system object data stores. In some embodiments, file system object stores may be located remotely from one or more file system management computers. Also, a logical file system object store or file system may be spread across two or more cloud computing environments, storage clusters, or the like.

In some embodiments, one or more replication engines, such as, replication engine 324 may be running on a file system management computer, such as, file system management computer 406 or file system management computer 410. In some embodiments, replication engines may be arranged to perform actions to replicate of one or more portions of one or more file systems.

In one or more of the various embodiments, the replication engine may be arranged to enable users to associate one or more portions of a source file system with a target file system. In one or more of the various embodiments, configuration information may be employed to identify a portion of the source file system and a location in the target file system.

In one or more of the various embodiments, it may be desirable to configure file systems, such as, file system 402 to be replicated onto one or more different file systems, such as, file system 404. Accordingly, upon being triggered (e.g., via schedules, user input, continuous replication, or the like), a replication engine running on a source file system, such as, file system 402 may be arranged to replicate its file system objects on one or more target file systems, such as, file system 404. In some embodiments, replication engines may be arranged to replicate file system objects based on snapshot values or current update epochs associated with the file systems. As described below in more detail.

In one or more of the various embodiments, file systems may be arranged as mirrored pairs such that a source file system is configured to automatically be replicated on a target file system. Accordingly, in one or more of the various embodiments, replication engines may execute replication jobs that copy changes from the source file system to the target file system. In some embodiments, replication engines may be arranged to copy file system objects that have been added or modified to the source file system since the previous replication job.

In some embodiments, to help ensure that the target file system provides a faithful copy of the source file system, the target file system may be arranged to be read-only, except for writes associated with a replication job. Thus, in some embodiments, users may be assured the target file system is not modified via writes from users or other file system clients.

In one or more of the various embodiments, if source file system is arranged to be mirrored on a target file system, the source file system and the target file system are considered to be in a mirroring relationship.

However, in some embodiments, replication jobs may be unexpectedly interrupted by equipment or system failures. For example, a network switch that connects a source file system with its target file system may fail during a replication job. Thus, in some embodiments, the state of the target file system may be unknown with respect to the source file system.

Also, in some embodiments, more generally, mirroring relationships may be experience planned or unplanned interruptions such that the state of the source file system or the target file system become unknown. For example, while a mirroring relationship is interrupted either the source file system or target file system may experience modifications that happen separate from the mirroring relationship.

Accordingly, in one or more of the various embodiments, recovery engines, such as, recovery engine 326 may be arranged to perform actions that return the state of the target file system to a known state. For example, if a replication job is interrupted the target file system may have successfully mirrored some but not all of the file system objects.

Also, in some cases, during the mirroring relationship interruption the target file system may be enabled for writing outside of the mirroring relationship. Such as activity may cause the target file system to have an unknown state with respect to its source file system.

In some cases, in response to mirror relationship interruptions, conventional systems may be arranged to compare each file system object on the source file system with its mirrored counterpart on the target file system. However, in some embodiments, the size or number of file system objects in some distributed file systems may make such comparisons disadvantageous because rebuilding the mirrored state from scratch may consume excessive computing or networking resources.

Therefore, in one or more of the various embodiments, recovery engines may be arranged to employ one or more known recovery points that indicate a known state of a given file system. Accordingly, in some embodiments, recovery engines may be arranged to maintain a database or mapping of the recovery points of the source file system and the target file system. In one or more of the various embodiments, a file system management system may be arranged to associate recovery points of the source file system with recovery points of the target system.

Accordingly, in some embodiments, recovery engine may be arranged to determine corresponding recovery points on each file system to determine the file system objects that may need to be recopied to target file system. In one or more of the various embodiments, recovery points may be associated with a successfully completed replication jobs.

Also, in one or more of the various embodiments, organizations may desire to reverse the roles of a mirrored file system pair such that the original source file system becomes the target file system and the original target file system becomes the source file system. Accordingly, in some embodiments, the recovery points on each file system may be employed to ensure mirroring of the previous target file system on the new target file system.

Also, in one or more of the various embodiments, organizations may temporarily activate the target file system (making it writable) and disable the source file system. For example, if an organization intends to perform a planned system upgrade on the source file system, the organization may accept writes on the target file system while the source file system off-line. Accordingly, if the original source file system is brought back online, recovery points may be employed to update the source file system with writes or other changes that were written to the target file system while the source file system was out of service.

Figure 5:
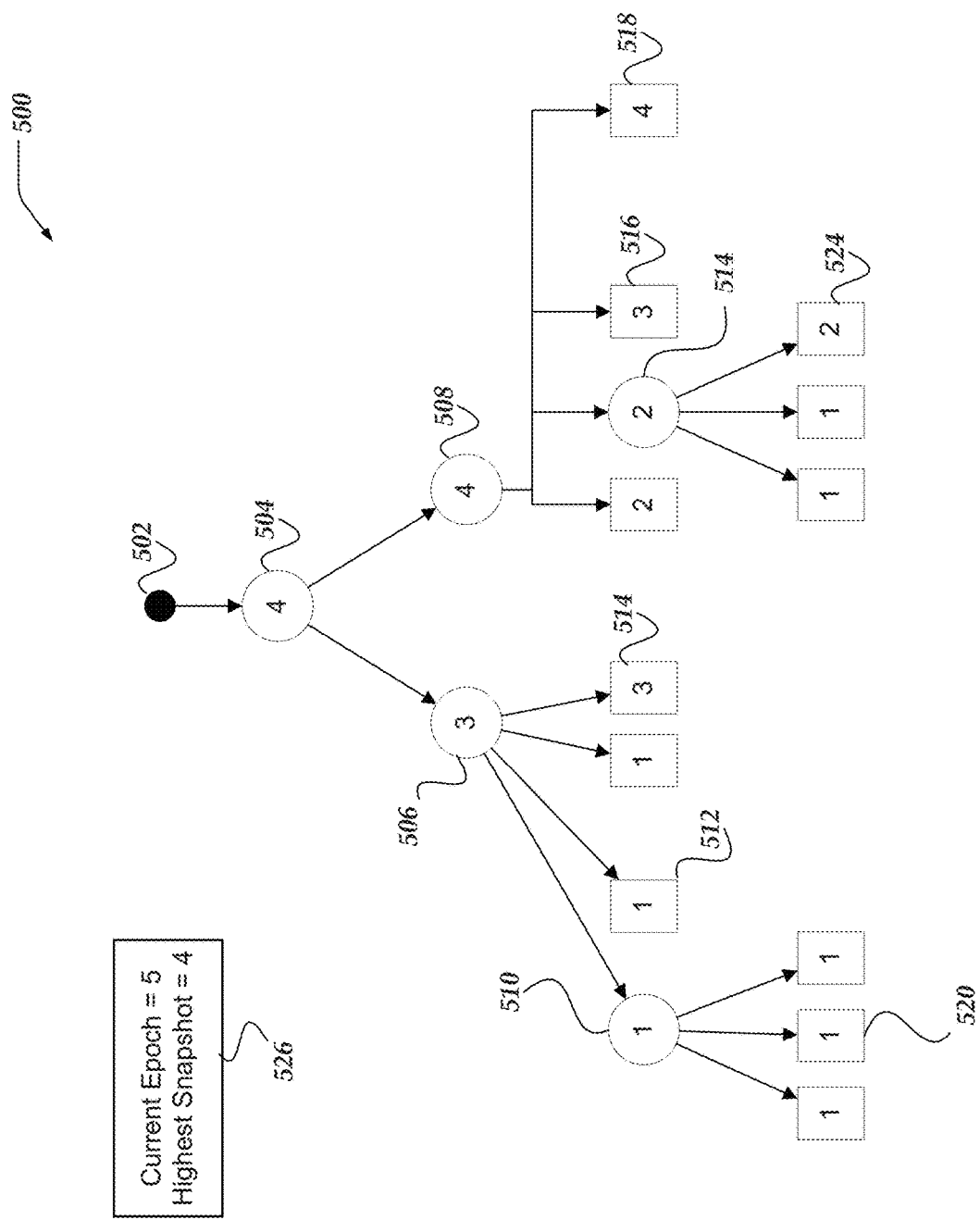
FIG. 5 illustrates a logical representation of file system 500 for managing file system state during replication jobs in accordance with one or more of the various embodiments.

FIG. 5 illustrates a logical representation of file system 500 for managing file system state during replication jobs in accordance with one or more of the various embodiments. In this example, for clarity and brevity file system 500 is represented as a tree, in practice, various data structures may be used to store the data that represents the tree-like structure of the file system. Data structures may include tabular formats that include keys, self-referencing fields, child-parent relationships, or the like, to implement tree data structures, such as, graphs, trees, or the like, for managing a file system, such as, file system 500.

In this example, circles are used to illustrate directory/folder file system objects. And, rectangles are used to represent other file system objects, such as, files, documents, or the like. The number in the center of the file system object represents the last/latest snapshot associated with the given file system object.

In this example, for some embodiments, root 502 is the beginning of a portion of a file system. Root 502 is not a file system object per se, rather, it indicates a position in a distributed file system. Directory 504 represents the parent file system object of all the objects under root 502. Directory 504 is the parent of directory 506 and directory 508. Directory 510, file object 512, and file object 514 are children of directory 506; directory 514, file object 516, and file object 518 are direct children of directory 508; file object 520 is a direct child of directory 510; and file object 524 is a direct child of directory 514. Also, in this example, for some embodiments, meta-data 526 includes the current update epoch and highest snapshot number for file system 500.

In this example, file system objects in file system 500 are associated with snapshots ranging from snapshot 1 to snapshot 4. The current epoch is number 5. Each time a snapshot is generated, the current epoch is ended and the new snapshot is associated with ending the current epoch. A new current epoch may then be generated by incrementing the last current epoch number. Accordingly, in this example, if another snapshot is generated, it will have a snapshot number of 5 and the current epoch will become epoch 6.

In one or more of the various embodiments, if two or more file systems, such as, file system 500 are arranged for replication, one file system may be designated the source file system and one or more other file systems may be designated target file systems. In some embodiments, the portions of the two or more file systems have the same file system logical structure. In some embodiments, the file systems may have different physical or implementations or representations as long as they logically represent the same structure.

In one or more of the various embodiments, at steady-state, parent file system objects, such as, directory 504, directory 506, directory 508, directory 510, directory 514, or the like, have a snapshot number based on the most recent snapshot associated with any of its children. For example, in this example, directory 504 has a snapshot value of 4 because its descendant, file object 518 has a snapshot value of 4. Similarly, directory 508 has the same snapshot value as file object 518. Continuing with this example, this is because file object 518 was modified or created sometime after snapshot 3 was generated and before snapshot 4 was generated.

In one or more of the various embodiments, if file system objects are not modified subsequent to the generation follow-on snapshots, they remain associated with their current/last snapshot. For example, in this example, directory 514 is associated with snapshot 2 because for this example, it was modified or created after snapshot 1 was generated (during epoch 2) and has remained unmodified since then. Accordingly, by observation, a modification to file object 524 caused it to be associated with snapshot 2 which forced its parent, directory 514 to also be associated with snapshot 2. In other words, for some embodiments, if a file system object is modified in a current epoch, it will be associated with the next snapshot that closes or ends the current epoch.

Compare, for example, in some embodiments, how directory 510 is associated with snapshot 1 and all of its children are also associated with snapshot 1. This indicates that directory 510 and its children were created during epoch 1 before the first snapshot (snapshot 1) was generated and that they have remained unmodified subsequent to snapshot 1.

In one or more of the various embodiments, if file system 500 is being replicated, a replication engine, such as, replication engine 324, may be arranged to employ the snapshot or epoch information of the file system objects in a file system to determine which file system objects should be copied to one or more target file systems.

In one or more of the various embodiments, replication engines may be arranged to track the last snapshot associated with the last replication job for a file system. For example, in some embodiments, a replication engine may be arranged to trigger the generation of a new snapshot prior to starting a replication jobs. Also, in some embodiments, a replication engine may be arranged perform replication jobs based on existing snapshots. For example, in some embodiments, a replication engine may be configured to launch a replication jobs every other snapshot, with the rules for generating snapshots being independent from the replication engine. Generally, in one or more of the various embodiments, replication engines may be arranged to execute one or more rules that define whether the replication engine should trigger a new snapshot for each replication job or use existing snapshots. In some embodiments, such rules may be provided by configuration files, user-input, built-in defaults, or the like, or combination thereof.

In one or more of the various embodiments, file system engines, such as, file system engine 322 may be arranged to update parent object meta-data (e.g., current update epoch or snapshot number) before a write operation is committed or otherwise consider stable. For example, if file object 520 is updated, the file system engine may be arranged to examine the epoch/snapshot information for directory 510, directory 506, and directory 504 before committing the update to file object 520. Accordingly, in this example, if file object 520 is updated, directory 510, directory 506 and directory 508 may be associated the current epoch (5) before the write to file object 520 is committed (which will also associated file object 520 with epoch 5) since the update is occurring during the current epoch (epoch 5).

Also, in one or more of the various embodiments, file system engine may generate recovery points based on replication jobs that run to completion. As discussed above, the file system objects for replication jobs may be determined based on snapshots. In some embodiments, a replication snapshot on a source file system may generated before starting a replication job. Thus, if the replication job completes without error, the target file system may associate the file system objects copied from the source file system with a replication snapshot on the target file system. Accordingly, in one or more of the various embodiments, the replication snapshot number of the source file system may be paired with the replication snapshot number on the target file system to provide a recovery point.

In one or more of the various embodiments, a recovery point may include a replication snapshot number of the source file system and a replication snapshot number of the target file system. However, in some embodiments, the replication snapshot number on the source file system may be generated before the replication job starts because it may be used to determine which file system objects to include in the job. Similarly, in some embodiments, the replication snapshot number on the target file system represents a snapshot associated with a completed replication job. Note, the value of the snapshot numbers on each file system do not be to the same. They do need to correspond to each other, but since each file system maintains its own snapshot numbers and current epochs, the values of the snapshot numbers included in a recovery point may be different.

In one or more of the various embodiments, if a replication job is interrupted, the replication snapshot on the source file system may remain valid. However, in some embodiments, since the replication job did not run to completion, a recovery point that includes that replication snapshot of the failed replication job will not be created.

Figure 6:
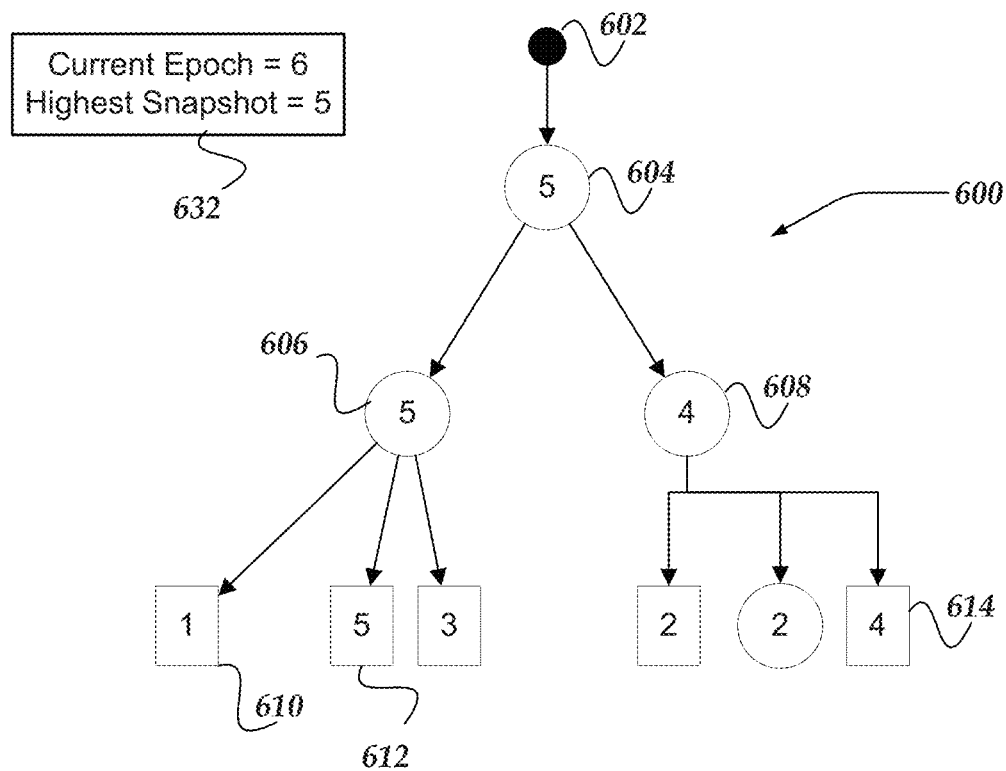
FIG. 6 illustrates a logical represent of two file systems arranged for replicating file system objects in distributed file systems in accordance with one or more of the various embodiments.
Figure 6:
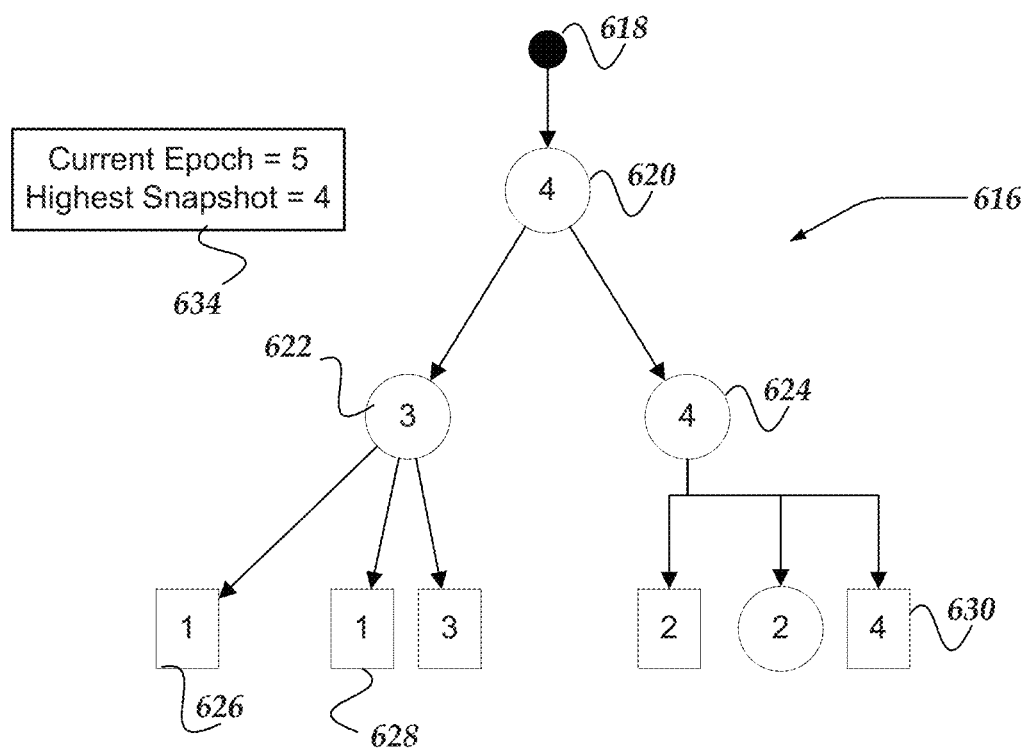

FIG. 6 illustrates a logical represent of two file systems arranged for replicating file system objects in distributed file systems in accordance with one or more of the various embodiments. In this example, file system 600 may be considered the source file system. In this example, file system 600 starts at root 602 and includes various file system objects, including, directory 604, directory 606, directory 608, file object 610, file object 612, file object 614, and so on. Likewise, for this example, file system 616 may be considered the target file system. In this example, file system 616 starts at root 618 and includes various file system objects, including, directory 620, directory 622, directory 624, file object 626, file object 628, file object 630, and so on.

Similar to FIG. 5, circles in FIG. 6 represent directory objects (file system objects that have children) and rectangles in FIG. 6 represent file system objects that are files, documents, blocks, or the like. The latest snapshot number for each file system object is indicated by the number in the center of each file system object. For example, directory object 606 is associated with snapshot number 5.

In one or more of the various embodiments, if a replication engine initiates a replication job, that job may be associated with a determined snapshot. In some embodiments, a replication engine may be arranged to trigger the generation of a snapshot before starting a replication job. In other embodiments, the replication engine may base a replication job on a snapshot that already exists. In this example, the replication engine may be arranged to initiate a replication job for the highest snapshot in file system 600, snapshot 5.

Accordingly, in one or more of the various embodiments, the replication engine may traverse file system 600 to identify file system objects that need to be copied to file system 616. In this example, as shown in the meta-data (meta-data 632) for file system 600, the current epoch for file system 600 is epoch 6 and the latest snapshot is snapshot 5. In some embodiments, the replication engine may be arranged to find the file system objects that have changed since the last replication job. In this example, meta-data 634 for file system 616 shows that the current epoch for file system 616 is epoch 5 and the latest snapshot for file system 616 is snapshot 4.

Note, in one or more of the various embodiments, the meta-data 632 or meta-data 634 may be stored such that they are accessible from either file system 600 or file system 616. Likewise, in some embodiments, one or more file systems may be provided meta-data information from another file system. In some embodiments, file systems may be arranged to communicate meta-data information, such as, meta-data 632 or meta-data 634 to another file system. In some embodiments, source file systems may be arranged to maintain a local copy of meta-data for the one or more target file systems. For example, in some embodiments, the source cluster may store the target cluster's Current Epoch/Highest Snapshot values.

In one or more of the various embodiments, file system 600 and file system 616 may be considered synced for replication. In some embodiments, configuring a replication target file system may include configuring the file system engine that manages the target file system to stay in-sync with the source file system. In some embodiments, staying in-sync may include configuring the target file system to be read-only except for replication activity. This enables snapshots on the target file system to mirror the snapshots on the source file system. For example, if independent writes were allowed on the target file system, the snapshots on the target file system may cover different file system objects than the same numbered snapshots on the source file system. This would break the replication process unless additional actions are taken to sync up the target file systems with the source file system.

In this example, a replication engine is configured to replicate file system 600 on file system 616. For this example, it can also be assumed that snapshot 5 of file system 600 is the latest snapshot that the replication engine is configured to replicate.

Accordingly, in this example, in one or more of the various embodiments, the replication engine may be arranged to determine the file system objects in file system 600 that need to be replicated on file system 616. So, in this case, where file system 616 has been synced to snapshot 4 of file system 600, the replication engine may be arranged to identify the file system objects on file system 600 that are associated with snapshot 5. The file system objects associated with snapshot 5 on file system 600 are the file system objects that need to be replicated on file system 616.

In one or more of the various embodiments, the replication engine may be arranged to compare the snapshot numbers associated with a file system object with the snapshot number of the snapshot that is being replicated to the target file system. Further, in one or more of the various embodiments, the replication engine may begin this comparison at the root of the source file system, root 602 in this example.

In one or more of the various embodiments, if the comparison discovers or identifies file system objects that have been modified since the previous replication job, those file system objects are the ones that need to be copied to the target file system. Such objects may be described as being in the replication snapshot. This means that that the file system object has changes that occurred during the lifetime of the snapshot the replication job is based on—the replication snapshot. If a directory object is determined to be in the replication snapshot, the replication engine may be arranged to descend into that object to identify the file system objects in that directory object that may need to be replicated. In contrast, if the replication engine encounters a directory object that is not in the replication snapshot, the replication engine does not have to descend into the that directory. This optimization leverages the guarantee that the snapshot value of a parent object is the same as the highest (or newest) snapshot that is associated with one or more of its children objects.

In one or more of the various embodiments, if the replication engine identifies file system objects in the source file system that may be eligible for replication, the contents of those file system objects may be copied to target file system. In one or more of the various embodiments, writing the data associated with the identified file system objects to the target file systems also includes updating the snapshot information and current epoch of the target file system.

In this example, file system 600 is being replicated to file system 616. FIG. 6 shows how file system 616 appears before the replication has completed. At the completion of the replication job, file system 616 will appear the same as file system 600, including an update to meta-data 634 that will record the current epoch for file system 616 as epoch 6 and set the highest snapshot to snapshot 5.

In this example, the file system objects that a replication engine would identify for replication include directory 604, directory 606, and file object 612 as these are the only objects in file system 600 that are associated with snapshot 5 of file system 600. In one or more of the various embodiments, after these file system object are copied to file system 616, file system 616 will look the same as file system 600. Accordingly, in this example: directory 620 will be associated with snapshot 5 (for file system 616); directory 622 will be associated with snapshot 5; and file object 628 will be modified to include the content of file object 612 and will be associated with snapshot 5.

In one or more of the various embodiments, after the replication engine has written the changes associated with the replication job to the one or more target file systems, it may be arranged to trigger the generation of a snapshot to capture the changes made by the replication job.

In summary, in one or more of the various embodiments, a replication job may start with a snapshot, the replication snapshot, on the source file system. One or more file system objects on the source file system are determined based on the replication snapshot. The determined file system objects may then be copied and written to the target file system. After all the determined file system objects are written to the target file system, a snapshot is taken on the target file system to preserve the association of the written file system objects to target file system replication snapshot. Note, in one or more embodiments, there may be variations of the above. For example, a target file system may be configured to close the target file system's current update epoch before a new replication job starts rather than closing the current update epoch at the completion of a replication job. For example, the target file system may be at current update epoch 4, when a new replication job starts, one of the replication engines first actions may be to trigger a snapshot on the target file system. In this example, that would generate snapshot 4 and set the current update epoch to epoch 5 on the target file system. Then in this example, the file system objects associated with the pending replication job will be modified on the target file system during epoch 5 of the target file system, which will result in them being associated with snapshot 5 when it is generated.

Similarly, in one or more of the various embodiments, snapshot values of paired or mirrored file systems may be employed to determine the file system objects that may have changes to rollback or discard if the replication engine is syncing a file system that has a current snapshot that is higher to a file system that has a lower snapshot. Continuing with the example described above, the file system objects on the first file system that are associated with snapshot 5 may be rolled back or discarded to bring first file system in sync to snapshot 4 of the second file system.

In one or more of the various embodiments, keeping the current epoch of the source file system and the target file system the same value may be not be a requirement. It this example, it is described as such for clarity and brevity. However, in one or more of the various embodiments, a source file system and a target file system may be configured to maintain distinct and different values for current epoch and highest snapshot even though the content of the file system objects may be the same. For example, a source file system may have been active much longer than the target file system. Accordingly, for example, a source file system may have a current epoch of 1005 while the target file system has a current epoch of 5. In this example, the epoch 1001 of the source file system may correspond to epoch 1 of the target file system. Likewise, for example, if the target file system has a current epoch of 1005 and the source target file system has a current epoch of 6, at the end of a replication job, the target file system will have a current epoch of 1006.

In one or more of the various embodiments, traversing the portion of file system starting from a designated root object and skipping the one or more parent objects that are unassociated with the replication snapshot improves efficiency and performance of the network computer or its one or more processors by reducing consumption of computing resources to perform the traversal. This increased performance and efficiency is realized because the replication engine or file system engine is not required to visit each object in the file store to determine if it has changed or otherwise is eligible for replication. Likewise, in some embodiments, increased performance and efficiency may be realized because the need for additional object level change tracking is eliminated. For example, an alternative conventional implementation may include maintaining a table of objects that have been changed since the last the replication job. However, for large file systems, the size of such a table may grow to consume a disadvantageous amount of memory.

In one or more of the various embodiments, as described above, replication engines may be arranged to designate or generate a snapshot as a replication snapshot. In some embodiments, replication snapshots on source file systems may be snapshots that represent the file system objects that need to be copied to from a source file system to a target file system. And, in some embodiments, replication snapshots on target file system may be associated with the file system objects copied from a source file system as part of a completed replication job.

In one or more of the various embodiments, if the replication job is interrupted, the replication snapshot on the source file system remains viable. However, in some embodiments, even though some file system objects may have been copied to the target file system, since the replication job did not run to completion the target file system may not provide a corresponding replication snapshot.

Figure 7:
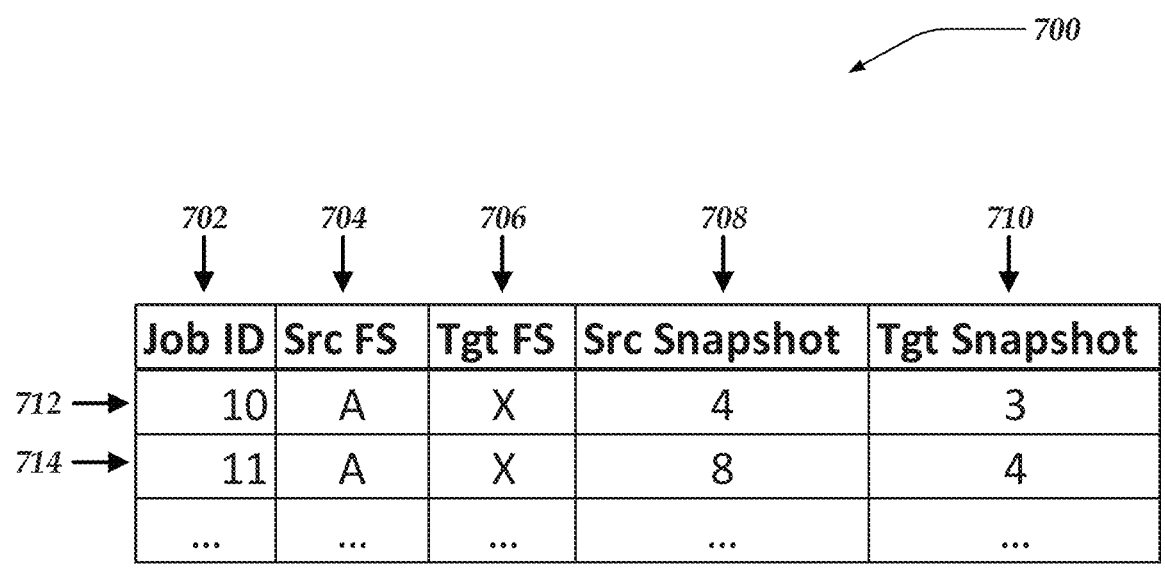
FIG. 7 illustrates of logical schematic of a portion of a data structure for managing file system state during replication jobs in accordance with one or more of the various embodiments.

FIG. 7 illustrates of logical schematic of a portion of data structure 700 for recovery checkpoints for distributed file systems in accordance with one or more of the various embodiments.

In one or more of the various embodiments, data structure 700 may be arranged to include columns for storing various attributes of recovery points. In this example, column 702 stores replication job identifiers, column 704 stores source file system identifiers, column 706 stores target file system identifiers, column 708 stores the replication snapshot number of the source file system, column 710 stores the replication snapshot number of the target file system.

In this example, row 712 illustrates a recovery point record. In this example, row 712 shows that file system A is being mirrored on file system X. Thus, in this example, file system A is the source file system and file system X is target file system in a mirroring relationship. Also, in this example, row 712 shows that replication snapshot number for the source file system is 4 and the replication snapshot number for the target file system is 3. Accordingly, in some embodiments, the information includes row 712 may be considered a recovery point for file system A and X. Row 712 shows that replication snapshot 4 on the source file system corresponds to replication snapshot 3 on the target file system. Accordingly, in some embodiments, the file system is guaranteeing that at the completion of replication job 10, snapshot 4 on the source file system and snapshot 3 on the target file system are associated with identical copies of the file system objects.

Likewise, in this example, row 714 shows that replication snapshot 8 on the source file system corresponds to replication snapshot 4 on the target file system. Accordingly, in some embodiments, the file system may provide a guarantee that at the completion of replication job 11, snapshot 8 on the source file system and snapshot 4 on the target file system are associated with identical copies of the file system objects.

Figure 8A:
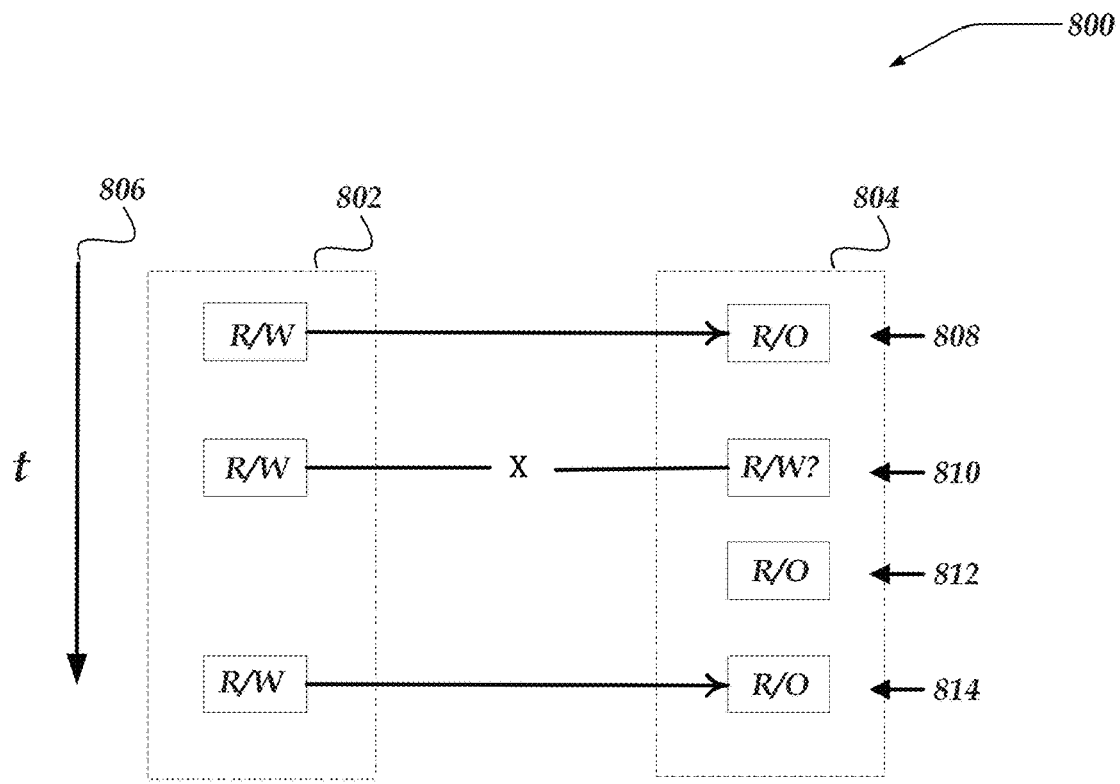
FIG. 8A illustrates a logical schematic of a system for managing file system state during replication jobs in accordance with one or more of the various embodiments.

FIG. 8A illustrates a logical schematic of system 800 for recovery checkpoints for distributed file systems in accordance with one or more of the various embodiments. As described above, in some embodiments, replication engines may be arranged to execute various replication jobs between source file systems and target file systems. In this example, for some embodiments, system 800 includes source file system 802, target file system 804, or the like. In this example, vector 806 represents the passage of time.

In this example, for some embodiments, at time 808, source file system 802 may be a file system enabled for read/write activity. In this example, source file system 802 may be configured to be mirrored with target file system 804. Accordingly, the arrow from source file system 802 to target file system 804 at time 808 represents a mirroring relationship between source file system 802 to target file system 804. As indicated by R/W or R/O, source file system 802 is writable (R/W) and target file system 804 is read-only (R/O) except for write actions comprising replication jobs. Accordingly, in some embodiments, file system engines may be ensured that the target file system maintains a faithful mirror of the data stored on source file system 802. In contrast, if target file system 804 is writable by users, the mirroring relationship may be disrupted because other users or services may introduce changes on file system 804 that may break the mirroring relationship.

At time 810, the mirroring relationship may be considered interrupted. In this example, there may be various planned or unplanned reasons for such an interruption, such as, planned upgrades, network failures, or the like. In some embodiments, as a result of the interruption, the contents of target file system 804 may be in an undetermined state with respect to source file system 802. Note, if the contents of target file system 804 may have been modified while the mirroring relationship is interrupted, target file system 804 may be considered out of sync with source file system 802. Also, in some embodiments, if a replication job may be interrupted, an indeterminate number of file system objects may have been copied from source file system 802 before the interruption.

At time 812, in some embodiments, the interruption to the mirroring relationship may be considered resolved. In some embodiments, a recovery engine, such as, recovery engine 326 may be arranged to perform various actions to restore target file system 804 to a known state before the mirroring relationship restored.

In one or more of the various embodiments, target file system 804 may be set to R/O mode to prevent file system clients from modifying target file system 802 while the mirroring relationship is reestablished.

Also, in one or more of the various embodiments, the recovery engine may determine the most recent recovery point associated with the mirroring. Accordingly, in one or more of the various embodiments, the recovery point may be arranged to include the source replication snapshot number and the target replication snapshot number associated with the last replication job that ran to completion.

In one or more of the various embodiments, the recovery engine may be arranged to revert or rollback target file system 804 to target replication snapshot determined from the recovery point. Since, in one or more of the various embodiments, the target replication snapshot number identifies the snapshot on the target file system that corresponds to the last replication job, it may be employed to identify modifications to target file system 804 that occurred during the interruption of the mirroring relationship.

In one or more of the various embodiments, the snapshot number associated with various parent file system objects enable the recovery engine to quickly determine if file system objects should be discarded. For example, if a target replication snapshot number is 4, the recovery engine can assume that any file system objects associated with a snapshot number of 4 or less should be retained and any file system objects associated with a snapshot number greater than 4 should be reverted and discarded because modifications associated with snapshots or a current epoch other than the target replication snapshot included in the recovery point may be associated with modifications that occurred while the mirroring relationship was interrupted. Likewise, in some embodiments, such file system objects may be file system objects copied during an interrupted replication job.

Reverting the modifications to target file system 804 that may be unassociated with the recovery point restores target file system 804 to a known state that corresponds to the last completed replication job associated with the mirroring relationship.

At time 814, the mirroring relationship between source file system 802 and target file system 804 has been reestablished. In some embodiments, if target file system 804 is reverted to a known recovery point, a replication engine may return to periodically executing replication jobs as part of a mirroring policy.

Figure 8B:
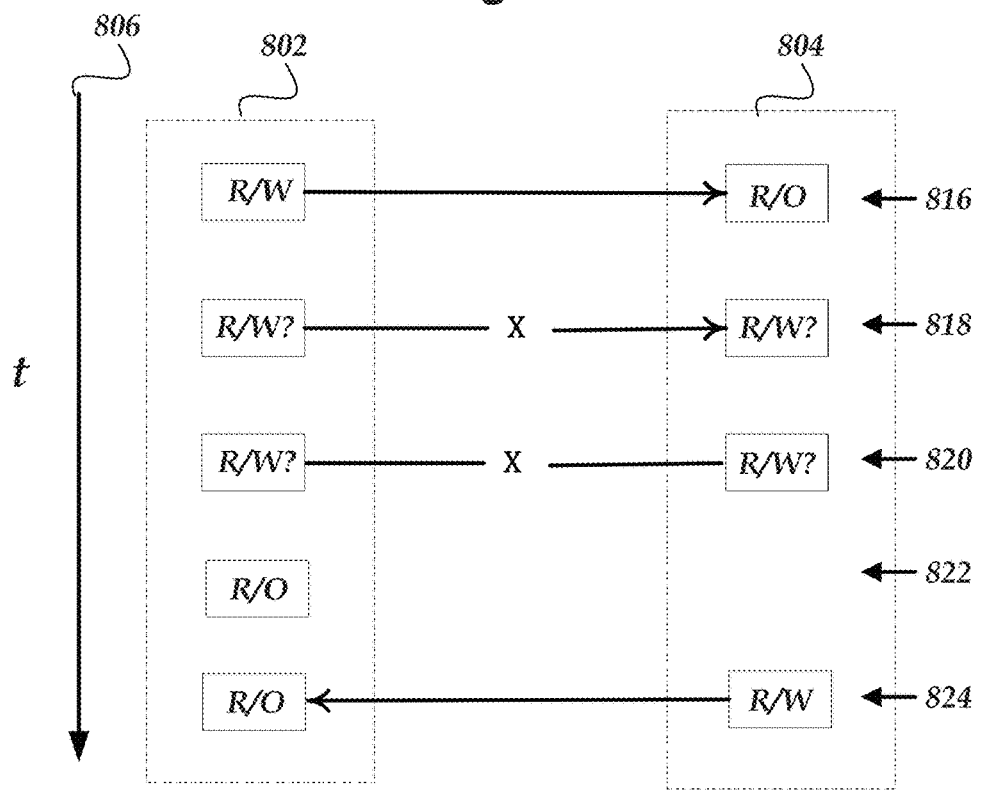
FIG. 8B illustrates a logical schematic of a system for managing file system state during replication jobs in accordance with one or more of the various embodiments.

FIG. 8B illustrates a logical schematic of system 800 for recovery checkpoints for distributed file systems in accordance with one or more of the various embodiments. A described above, in some embodiments, replication engines may be arranged to execute various replication jobs between source file systems and target file systems. In this example, for some embodiments, system 800 includes source file system 802, target file system 804, or the like. In this example, vector 806 represents the passage of time.

In this example, similar to FIG. 8A, at time 816, source file system 802 and target file system 804 may be considered to be in an active mirroring relationship. Accordingly, in this example, the arrow between source file system 802 and target file system 804 represent the direction of the mirroring relationship. Thus, in this example, a replication engine may be copying file system objects associated with replication snapshots from source file system 802 to target file system 804.

At time 818, for various reasons, the mirroring relationship between source file system 802 and target file system 804 may be disrupted. As described above, this scenario may occur for various planned or unplanned reasons.

At time 820, the mirroring relationship has been severed and either file system (source file system 802 or target file system 804) may be involved in other file system operations that may not be automatically copied to either file system.

At time 822, in this scenario, the organization intends to reverse the roles of the file systems. Accordingly, in one or more of the various embodiments, a recovery engine may be arranged to determine a recovery point based on the last completed replication job. However, since, in this example, the mirroring relationship is being reversed, the original source file system, source file system 802 may take the role of the target file system, while the original target file system, target file system 804 may take the role of source file system.

Accordingly, in some embodiments, a source file system may be changed to the target file system. However, before a file system can become a target file system in a mirroring relationship, the file system objects not included in the last completed replication job need to be discarded. See, the description for time 812 above regarding how recovery points may be employed to facilitate determining which file system objects on a file system, such as, source file system 802 may be discarded to prepare file system 802 to mirror target file system 804.

At time 824, if the reversion of source file system 802 to the last good replication snapshot is completed, another mirroring relationship may be established that copies data from target file system 804 to source file system 802.

Note, for brevity and clarity, the source/target designations for source file system 802 and target file system 804 have been maintained even though the roles have reversed. One of ordinary skill in the art will appreciate that the source/target roles associated with file system can vary. And, that the file system sending files to another file system is the source file system and the file system that is receiving those files is the target file system.

Figure 9:
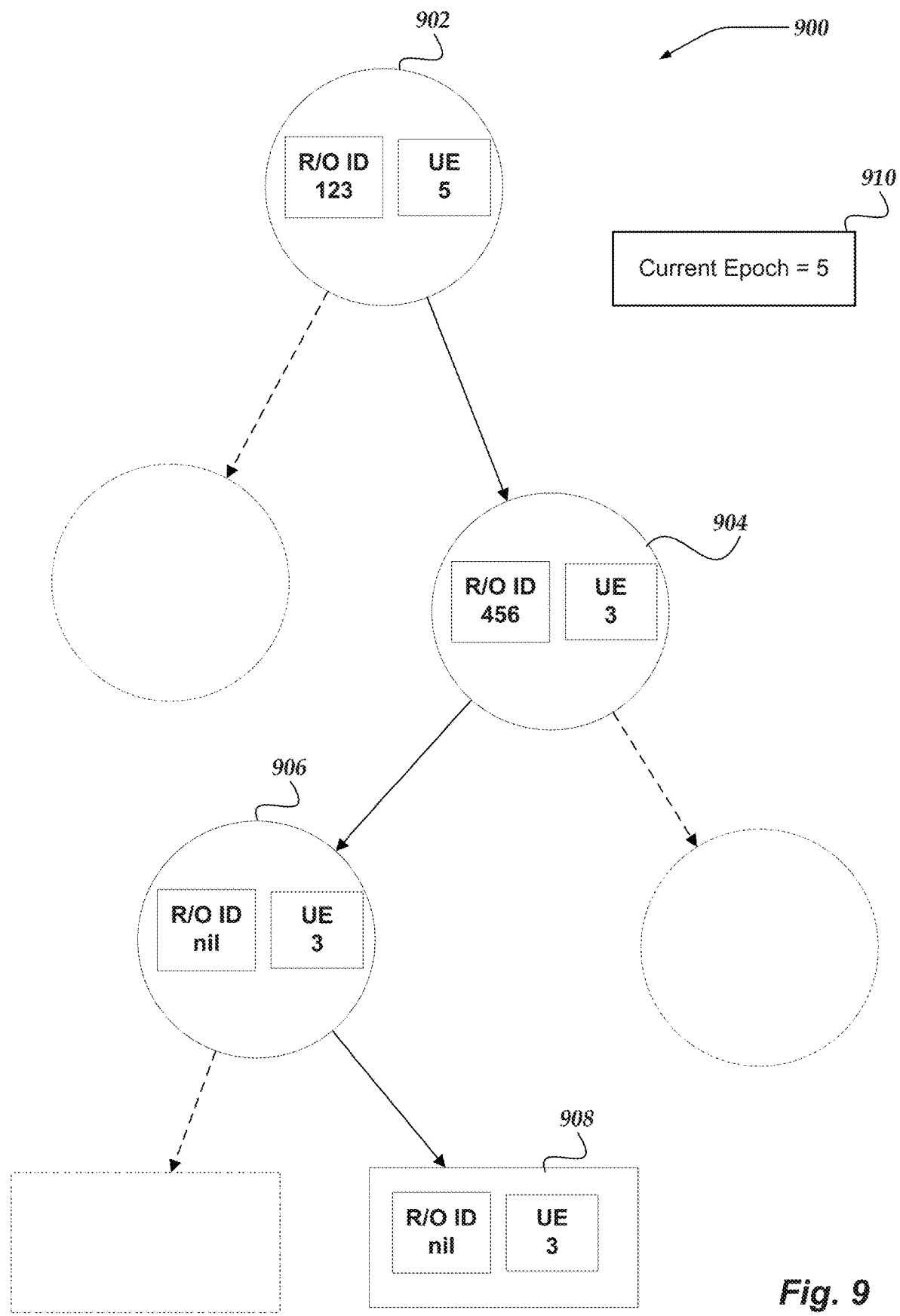
FIG. 9 illustrates a logical representation of a portion of file a system for managing file system state during replication jobs in accordance with one or more of the various embodiments.

FIG. 9 illustrates a logical representation of a portion of file system 900 for recovery checkpoints for distributed file systems in accordance with one or more of the various embodiments. In this example, for clarity and brevity file system 900 is represented as a tree, in practice, various data structures may be used to store the data that represents the tree-like structure of the file system. Data structures may include tabular formats that include keys, self-referencing fields, child-parent relationships, or the like, to implement tree data structures, such as, graphs, trees, or the like, for managing a file system, such as, file system 900.

In this example, circles are used to illustrate directory/folder file system objects. And, rectangles are used to represent other file system objects, such as, files, documents, or the like. Also, in this example, nodes and edges represented using dashed lines represent one or more other file system objects that may comprise file system 900.

In some embodiments, file system objects may be associated with update epochs, read-only identifiers, or the like. In some embodiments, there may be additional meta-data, such as, timestamps, permission information, size, information, or the like. In some embodiments, some or all of this type of information may be stored in inode data structures. In this example, the read-only identifiers and update epochs are illustrates using the boxes that are inside of the file system objects labeled as 'R/O ID' for read-only identifiers and 'UE' for the update epochs.

In one or more of the various embodiments, file system engine may be arranged to configure file system as read-only by generating a read-only identifier and associating it with file system objects that are considered read-only. Accordingly, write requests directed to file system objects associated with a valid read-only identifiers may be rejected.

However, in some embodiments, setting read-only identifiers on all of the file system objects in a file system may consume a disadvantageous amount of resources or time.

Accordingly, in one or more of the various embodiments, file system engines may be arranged to set a read-only identifier on the root of the file system that is being configured to be read-only. Thus, in some embodiments, entire file systems may be set to read-only mode by setting one read-only identifier in one file system object.

In one or more of the various embodiments, as write requests are received, file system engines may be arranged to check if the write objects may be associated with a current (e.g., active or valid) read-only identifier. In some embodiments, if the write objects are associated with a current read-only identifier, the file system engine may be arranged to deny the write request.

In this example, a file system engine has marked file system 900 as read-only by providing a read-only identifier and associating it with file system object 902. In this example, file system object 902 may be considered the root directory of file system 900. Accordingly, in this example, the file system engine has associated the read-only identifier with a value of 123 with file system object 902. Also of note, the update epoch for file system object 902 is updated to the current update epoch for the file system. In this example, box 910 represents the data structure storing the current update epoch for the file system. Accordingly, in this example, the current update epoch is 5 (e.g, epoch 5) so the update epoch for file system object 902 is set to 5 to match the current update epoch of the file system.

Sometime later, a write request may be received for file system object 908. Accordingly, in some embodiments, the file system engine may be arranged to examine the meta-data associated with file system object 908 to determine if a current read-only identifier is associated with the object. In this example, file system object 908 is not associated with a read-only identifier.

Accordingly, in some embodiments, the file system engine may begin examining the ancestor file system objects of file system object 908 looking for a current read-only identifier. In some embodiments, the file system engine may be arranged to visit the direct parent object of file system object 908.

In this example, file system object 906 is the parent of file system object 908. In some embodiments, file system engines may be arranged to check each visited ancestor object for a current read-only identifier. In this example, file system object 906 does not have current read-only identifier, so the file system engine may advance to the next ancestor, file system object 904 to look file system object a current read-only identifier.

In this example, for some embodiments, file system object 904 may be the next file system object encountered by the file system engine. In this example, file system object 904 is associated with a read-only identifier, but it is a stale read-only identifier rather than a current read-only identifier.

In one or more of the various embodiments, stale read-only identifiers may be read-only identifier associated with file system objects that are not at the current update epoch. In this example, while file system object 906 is associated with read-only identifier 456 it is not associated with the current update epoch of the file system. Accordingly, in some embodiments, the read-only identifier for file system object 904 may be considered stale. In one or more of the various embodiments, the read-only identifier may be considered stale because the update epoch associated with file system object 904 is less than the current update epoch for the file system.

In one or more of the various embodiments, file system engines may be arranged to continue working up the file system tree because the read-only identifier associated with file system object 904 may be considered stale. So, in some embodiments, the file system engine may examine the next higher ancestor. In this example, the file system engine may next encounter file system object 902.

In this example, file system object has a read-only identifier and its update epoch matches the current update epoch for the file system. In one or more of the various embodiments, this condition may indicate the all objects descending from file system object 902 are read-only objects.

In one or more of the various embodiments, at this point, the file system engine may be arranged to deny the write request. In some embodiments, it may be advantageous to update the file system objects that were visited during the search for a current read-only identifier. For example, the relevant data structures may been loaded into local memory or caches so the expensive of looking them up again may be avoided.

Accordingly, in one or more of the various embodiments, file system engines may be arranged to update the visited ancestors to with the current read-only identifier and the current update epoch. In some embodiments, file system engines may be arranged to reverse the traversal and walk back down to file system object 908 (e.g., the write object) setting the current read-only identifier and the update epoch as it goes.

Figure 10:
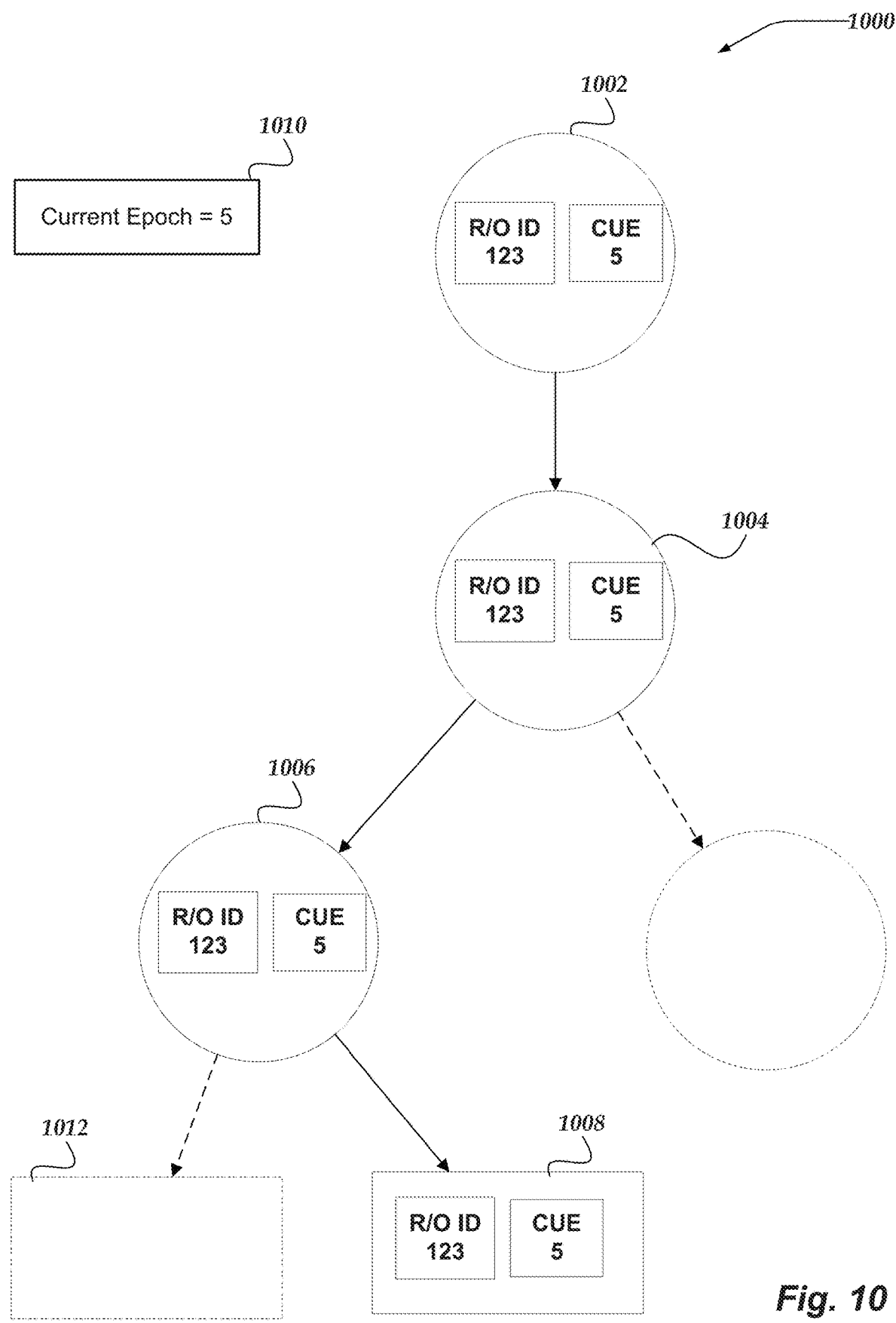
FIG. 10 illustrates a logical representation of a portion of a file system for managing file system state during replication jobs in accordance with one or more of the various embodiments.

FIG. 10 illustrates a logical representation of a portion of file system 1000 for recovery checkpoints for distributed file systems in accordance with one or more of the various embodiments. In this example, for clarity and brevity file system 1000 is represented as a tree, in practice, various data structures may be used to store the data that represents the tree-like structure of the file system. Data structures may include tabular formats that include keys, self-referencing fields, child-parent relationships, or the like, to implement tree data structures, such as, graphs, trees, or the like, for managing a file system, such as, file system 1000.

In this example, file system 1000, includes file system object 1002, file system object 1004, file system object 1006, file system object 1008, file system object 1012, and a data structure 1010 for storing the current update epoch of the file system.

In this example, file system 1000 may be considered the same or similar to file system 900 described above. Accordingly, for brevity and clarity a detailed description of the elements in file system 1000 is not duplicated here.

In this example, file system 1000 shows how file system 900 may be represented after the write request described in FIG. 9 has been processed. Accordingly, in this example, the read-only identifier for the write object (file system object 1008) and its ancestors (e.g., file system object 1006, file system object 1004, and file system object 1002) are set to read-only identifier 123.

Accordingly, in one or more of the various embodiments, if a subsequent write request is directed towards file system object 1008, the file system engine can immediately determine that the write request should be denied. Similarly, in this example, if a write request comes in for one or more siblings of file system object 1008 (e.g., file system object 1012, or the like), the file system engine may determine its read-only status by examining file system object 1006 rather than being required to walk up to file system object 1002.

Generalized Operations

FIGS. 11-20 represent generalized operations for recovery checkpoints for distributed file systems in accordance with one or more of the various embodiments. In one or more of the various embodiments, processes 1100, 1200, 1300, 1400, 1500, 1600, 1700, 1800, 1900, and 2000 described in conjunction with FIGS. 11-20 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 11-20 may perform actions for managing file system state during replication jobs in accordance with at least one of the various embodiments or architectures such as those described in conjunction with FIGS. 4-8. Further, in one or more of the various embodiments, some or all of the actions performed by processes 1100, 1200, 1300, 1400, 1500, 1600, 1700, 1800, 1900, and 2000 may be executed in part by file system engine 322, replication engine 324, or recovery engine 326.

Figure 11:
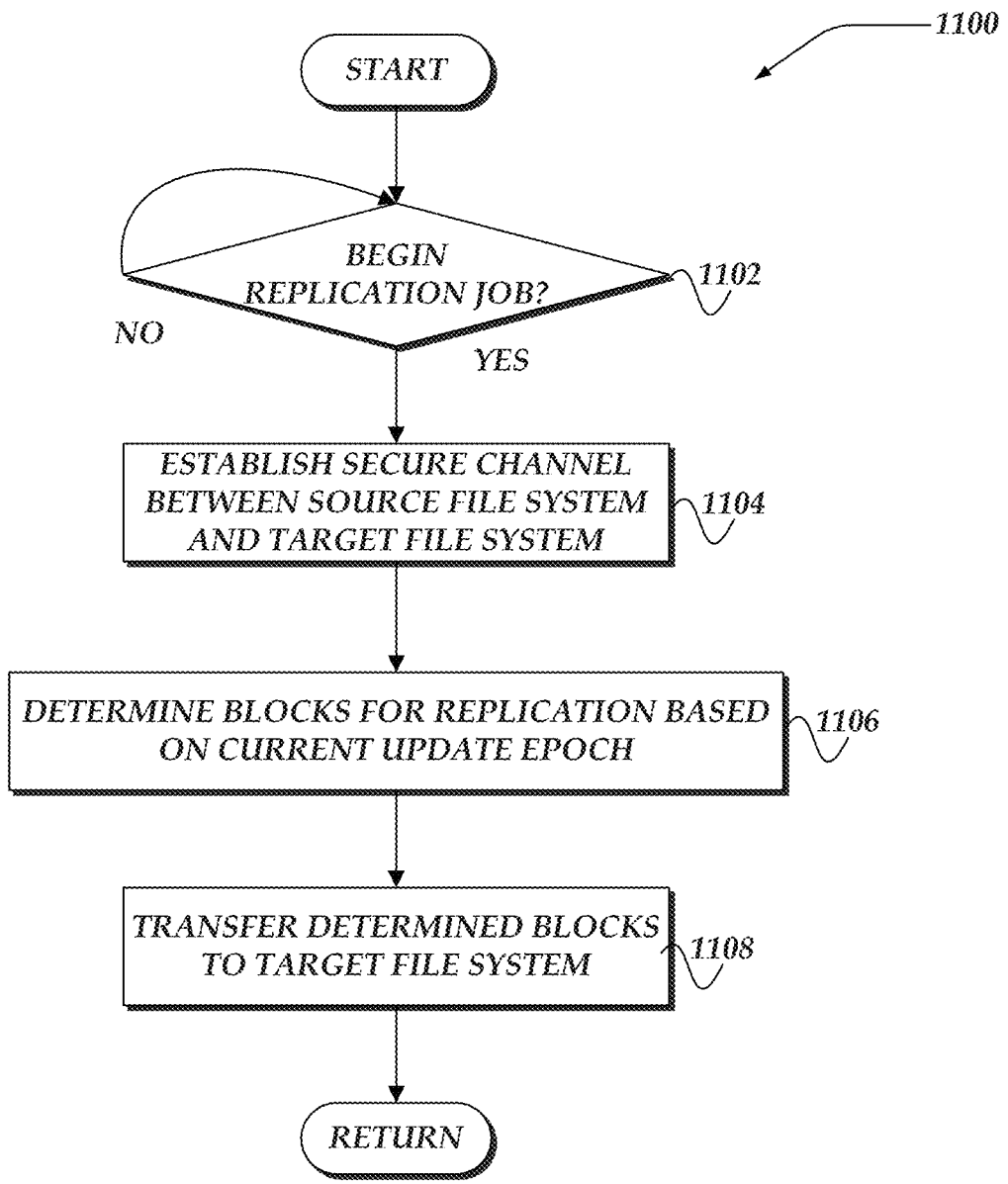
FIG. 11 illustrates an overview flowchart for a process for managing file system state during replication jobs in accordance with one or more of the various embodiments.

FIG. 11 illustrates an overview flowchart for process 1100 for recovery checkpoints for distributed file systems in accordance with one or more of the various embodiments. After a start block, at decision block 1102, in one or more of the various embodiments, if a replication job is started, a replication engine, such as, replication engine 324 may be instantiated to perform various actions, starting at block 1104; otherwise, control may loop back to decision block 1102.

At block 1104, in one or more of the various embodiments, the replication engine or file system engine may establish or confirm a secure communication channel between a source file system and one or more target file systems. In some embodiments, a replication engine or a file system engine may be arranged to select or employ a secure channel that may be configured separately. For example, in some embodiments, replication engines may use one or more virtual private networks, secure tunnels, secure connections, or the like, that have been setup prior to the start of a replication job. In some embodiments, replication engines or file system engines may be arranged to establish a new secure connection for each replication job. In other embodiments, preexisting secure connections may be used.

In one or more of the various embodiments, secure connections may be established using conventional or customized methods. In some embodiments, the some or all of the credential information that is necessary for establish the secure communication channels may be stored in configuration information or provided via user input, and may include, SSL/TLS certificates, passwords, pass phrases, one or more cryptographic keys or key pairs, or the like, or combination thereof.

At block 1106, in one or more of the various embodiments, the replication engine may be arranged to determine one or more file system objects for replication based on the current update epoch or a designated source replication snapshot. As described above, and in more detail below, the replication engine may be arranged to scan the source file system to identify file system objects to include in the replication job. Generally, in one or more of the various embodiments, file system objects associated with the replication snapshot are file system objects that were modified during the epoch that was closed or ended by the replication snapshot.

At block 1110, in one or more of the various embodiments, the replication engine may be arranged to communicate the one or more file system objects that are selected for replication from the source file system to the target file system. In one or more of the various embodiments, the replication engine may use the secure communication channel that was described for block 1104. Next, control may be returned to a calling process.

Figure 12:
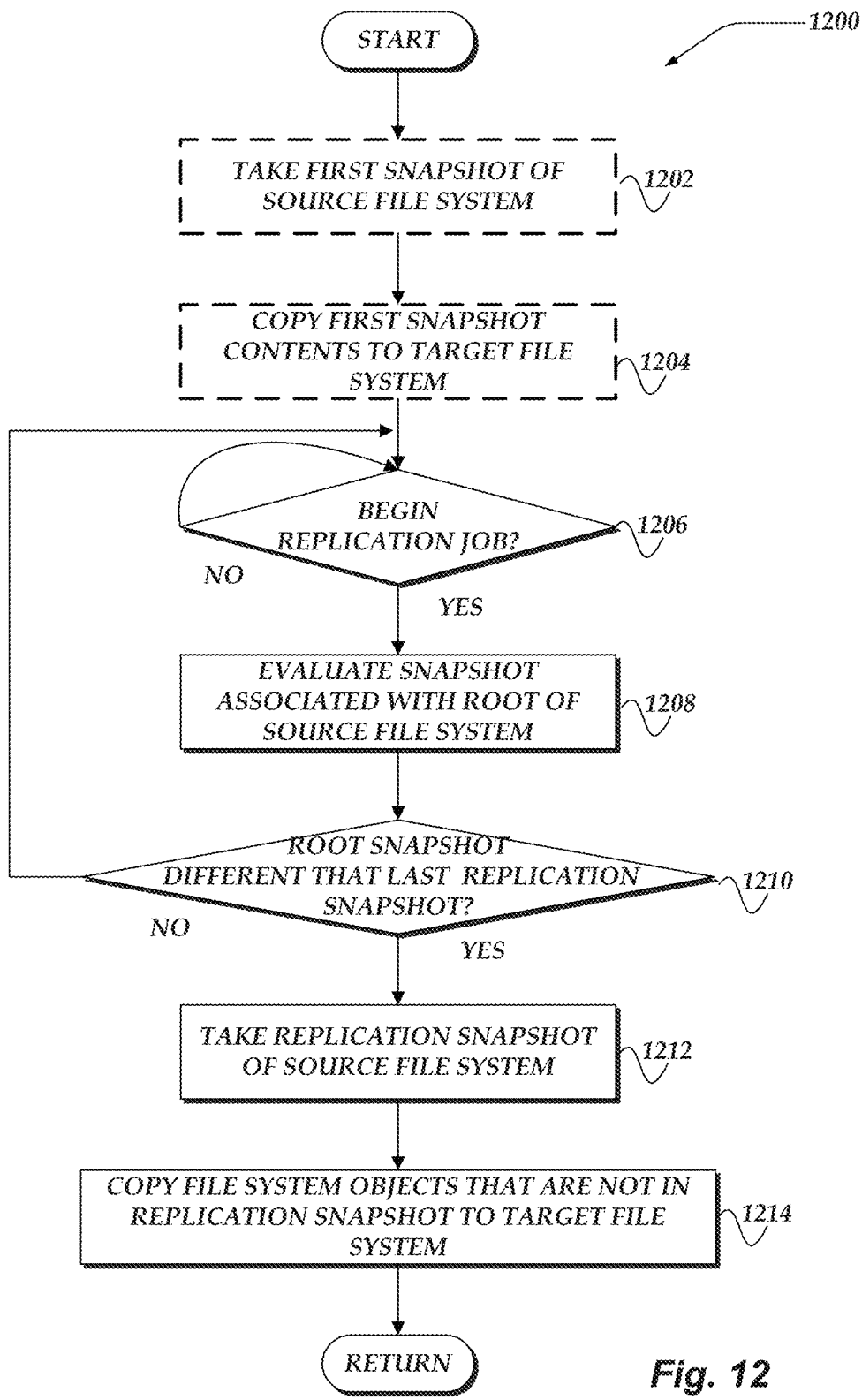
FIG. 12 illustrates a flowchart of a process for replicating file system objects in distributed file systems in accordance with one or more of the various embodiments.

FIG. 12 illustrates a flowchart of process 1200 for replicating file system objects in distributed file systems in accordance with one or more of the various embodiments. In one or more of the various embodiments, replication engines may be instantiated to perform various actions to perform replication jobs. Process 1200 describes one or more of the various actions for replicating file system objects in a distributed file system. After a start block, at block 1202, in one or more of the various embodiments, optionally, the replication engine may generate a first snapshot for replication of the source file system. In some embodiments, if replication is being setup or performed for the first time, the replication engine may generate a first replication snapshot.

In some embodiments, this block may be optional because the source file system and the one or more target file systems may be in sync. For example, they may be brand new file systems that are setup with replication rules before users are allowed to store data in the source file system. In this case, a special first replication snapshot it not required, normal replication job snapshots (e.g., block 1208) may suffice.

At block 1204, in one or more of the various embodiments, optionally, if the source file system and one or more target file system are being setup as replication pairs, the one or more target file system might not be synced with the source file system. For example, one or more of the target file system may be new or otherwise empty file systems. Accordingly, for example, the replication engine may initialize the one or more target file systems with the file system objects on the source file system. In some cases, the entire contents of the source file system may be copied or otherwise regenerated onto the one or more target file system.

In some embodiments, this block may be optional because the source file system and the one or more target file systems may be in sync. For example, they may all be brand new file systems that are setup with replication rules before users are allowed to store data in the source file system.

At decision block 1206, in one or more of the various embodiments, if a replication job is started, control may flow to block 1208; otherwise, control may loop back to decision block 1206. In one or more of the various embodiments, as discussed above replication engines may be arranged to employ policy rules, configuration information, user input, or the like, to determine if a replication job should be initiated. For example, in some embodiments, replication engines may be arranged to execute a replication job every hour (or other time periods). Likewise, in one or more of the various embodiments, replication engines may be arranged to execute replication jobs if one or more conditions are met, such as, time-of-day, number of modifications to the source file system, the occurrence of one or more events, actions performed by specific applications, or the like. In some embodiments, replication engines may be arranged to initiate replication jobs upon the occurrence of one or more triggering conditions or events that may be associated with one or more applications, servers, users, file system objects, or the like. For example, rules may be provided that execute a replication job each time a specific directory or file is modified or if one or more applications perform a particular action. For example, a replication engine may be configured to initiate a replication job each time a caching component writes stored values to persistent storage.

At block 1208, in one or more of the various embodiments, the replication engine may be arranged to evaluate the snapshot associated with the root of the source file system to determine if the a replication snapshot should be generated. Accordingly, the replication engine may compare the snapshot number associated with the root file system object with the snapshot number associated with the last replication job. As discussed above, if the snapshot of the root object is the same as the last replication snapshot, it indicates that none of the file system objects below the root object have been modified at least since the last replication job was executed. Accordingly, the replication job may be considered completed before it does any more work. Note, in some embodiments, the root object may be considered a root of a portion of the source file system that is being replicated rather than being restricted to being the root of the entire source file system. Accordingly, in this context, the root object may be the root object of replication job.

At decision block 1210, in one or more of the various embodiments, if the snapshot number associated with the root file system object is different than the snapshot number associated with the last replication snapshot, control may flow to block 1212; otherwise, control may loop back to decision block 1206 because the replication job is complete since there are no file system objects to replicate.

At block 1212, in one or more of the various embodiments, the replication engine may generate a replication snapshot on the source file system. In some embodiments, the replication snapshot may be based on the entire source file system, or a portion of the source file system.

At block 1214, in one or more of the various embodiments, the replication engine may be arranged to copy the one or more file system objects that are associated with replication snapshot from the source file system to the one or more target file systems. In one or more of the various embodiments, if the copying of file system objects associated with the replication job is complete, the replication engine may be arranged to trigger a snapshot to occur on the one or more target file systems. For example, if the replication snapshot is snapshot 5 on the source file system and the current update epoch on the target file system is epoch 5, the writes on the target file system that are associated with the replication job will occur in epoch 5 on the target file system. Upon completion of the replication job, the replication engine may trigger the file system engine to close epoch 5 by creating snapshot 5 to associate the modifications performed by the replication job with snapshot 5. Next, control may be returned to a calling process.

Figure 13:
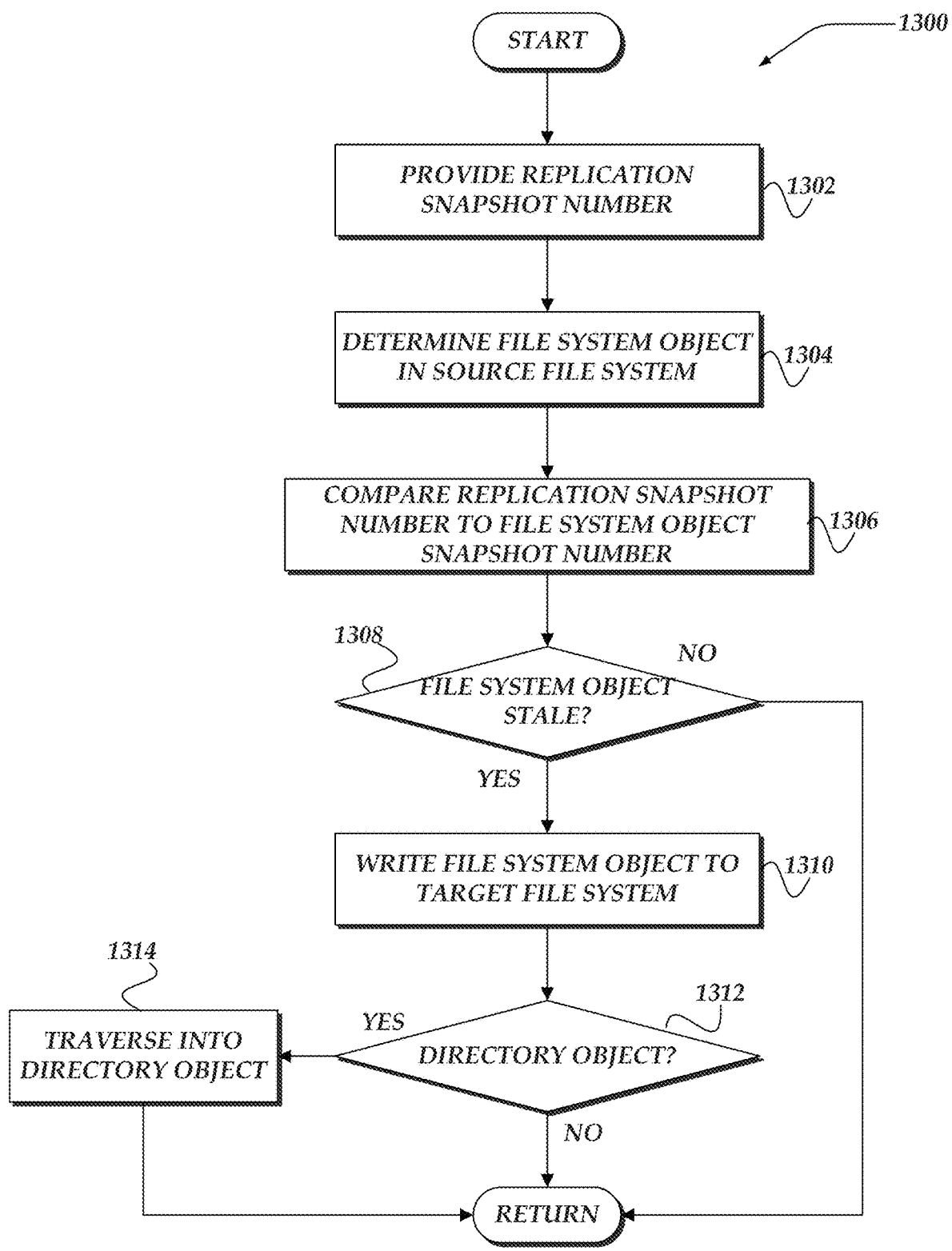
FIG. 13 illustrates a flowchart of a process for replicating a file system object in a distributed file system in accordance with one or more of the various embodiments.

FIG. 13 illustrates a flowchart of process 1300 for replicating a file system object in a distributed file system in accordance with one or more of the various embodiments. After a start block, at block 1302, in one or more of the various embodiments, a replication snapshot number may be provided to a replication engine. In some embodiments, the replication engine may generate or trigger the generation of the replication snapshot. For example, replication engines may be arranged to trigger a snapshot to be taken before it runs one or more replication jobs. In some embodiments, the replication engine may be provided a snapshot number corresponding to snapshot that is already available on the source file system.

At block 1304, in one or more of the various embodiments, the replication engine may determine a file system object to examine for replication eligibility. In one or more of the various embodiments, one or more file system objects in the source file system may qualify for the pending replication job. In one or more of the various embodiments, the replication engine may scan the source file system to identify one or more file system objects that may be eligible for the replication job.

At block 1306, in one or more of the various embodiments, the replication engine may be arranged to compare the replication snapshot number to the latest snapshot number that is associated with the one or more file system objects.

At decision block 1308, in one or more of the various embodiments, if the file system object is stale, control may flow to block 1310; otherwise, control may be returned to a calling process. For example, if the replication snapshot is snapshot X and the snapshot associated with the file system object is snapshot X, the file system object may be eligible for replication. In one or more of the various embodiments, the replication engine may be arranged to test if the file system object has been modified in the replication snapshot meaning it was modified during the epoch that corresponds to the replication snapshot.

At block 1310, in one or more of the various embodiments, the file system object may be written to the one or more target file systems. In one or more of the various embodiments, if the file system object is a file object (e.g., documents, files, blocks, or the like) the meta-data and changed contents of the of the file system object may be copied to the target file system.

At decision block 1312, in one or more of the various embodiments, if the file system object is a directory object (e.g., a file system object that is a parent of other file system objects), control may flow to block 1014; otherwise, control may be returned to a calling process.

At block 1314, in one or more of the various embodiments, because the file system object is a stale directory object, the replication engine may be arranged to descend into the file system object to check for child file system objects that may be stale. Note, if the directory object is not stale, the replication engine may skip over the directory object rather than descend into it because it is guaranteed that the child objects will not be eligible for replication. For example, if a child file system object is eligible for replication, its parent object will be eligible as well. Next, control may be returned to a calling process.

Figure 14:
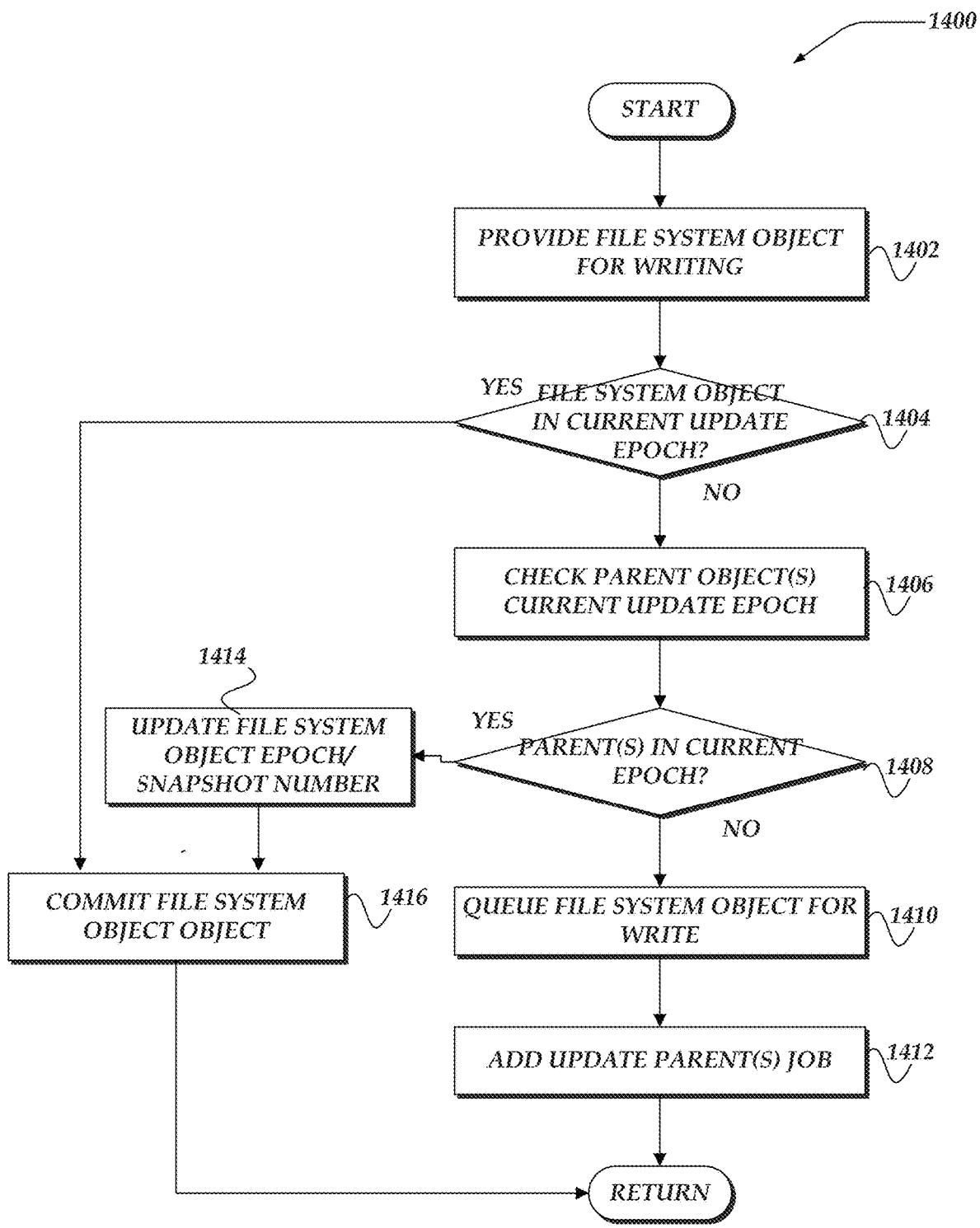
FIG. 14 illustrates a flowchart of a process for writing a file system object to a file system in a distributed file system in accordance with one or more of the various embodiments.

FIG. 14 illustrates a flowchart of process 1400 for writing a file system object to a file system in a distributed file system in accordance with one or more of the various embodiments. After a start block, at block 1402, in one or more of the various embodiments, a file system object may be provided to a file system engine for writing (e.g., creating, updating, deleting, or the like).

At decision block 1404, in one or more of the various embodiments, if the file system object is in the current update epoch of the file system, control may flow to block 1416; otherwise, control may flow to block 1406.

At block 1406, in one or more of the various embodiments, the file system engine may check the current update epoch or snapshot numbers for each parent of the file system object. If the immediate parent of the file system object is not in the current update epoch or in the latest snapshot (e.g., the replication snapshot) the file system engine will examine the parents object's parent (if any) to determine if it is current update epoch or latest snapshot. Accordingly, in some embodiments, the file system engine may be arranged to visit each parent object in ascending order. It may terminate its ascent upon discovering the first ancestor that is in the current update epoch or in the latest snapshot.

At decision block 1408, in one or more of the various embodiments, if the parents' of the file system object (if any) are in the current epoch of the file system, control may flow to block 1414; otherwise, control may flow to block 1410.

At block 1410, in one or more of the various embodiments, the file system engine may be arranged to queue the file system object write operation. In one or more of the various embodiments, file system engine may be arranged to perform one or more pre-commit operations before committing the write to stable/persistent storage. Accordingly, during the execution of the one or more pre-commit actions, the file system object write may be may be queued until the pre-commit tasks have been executed.

At block 1412, in one or more of the various embodiments, the file system engine may be arranged to add an update parent(s) job to a local work queue. In one or more of the various embodiments, one or more ancestors of the file system object may be updated to reflect that they or one or more of their children have been modified in the current update epoch or that they are associated with the latest snapshot. In some embodiments, if the parents are updated successfully, the file system object write may continue, In this example, process 1400 may dequeue the write operation for the file system object and pass control to block 1414. Next, control may be returned to a calling process.

At block 1414, in one or more of the various embodiments, the file system object meta-data may be updated to reflect that it has been updated in the current epoch or associated with the latest snapshot, such as, a replication snapshot. At block 1416, in one or more of the various embodiments, the file system object write may be committed to stable storage. Next, control may be returned to a calling process.

Figure 15:
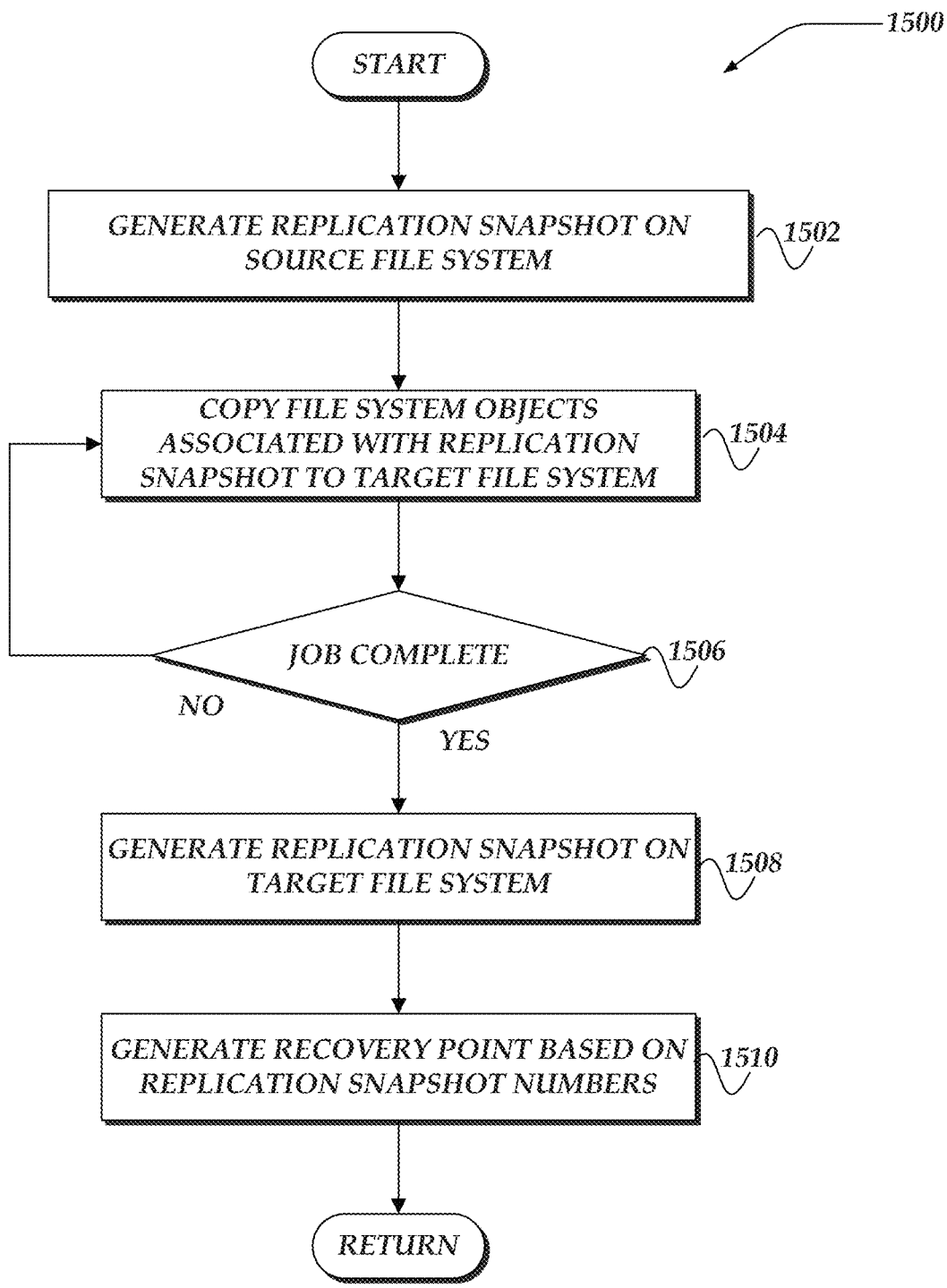
FIG. 15 illustrates a flowchart of a process for managing file system state during replication jobs in accordance with one or more of the various embodiments.

FIG. 15 illustrates a flowchart of process 1500 for recovery points for distributed file systems in accordance with one or more of the various embodiments. After a start block, at block 1502, in one or more of the various embodiments, a replication engine may be arranged to generate a replication snapshot on the source file system.

At block 1504, in one or more of the various embodiments, a file system engine may be arranged to copy one or more file system objects that may be associated with the replication snapshot to a target file system.

At decision block 1506, in one or more of the various embodiments, if the replication job is complete, control may flow to block 1508; otherwise, control may loop back to block 1504.

At block 1508, in one or more of the various embodiments, a replication engine may be arranged to generate a replication snapshot on the target file system. As described above, the replication engine may traverse the source file system using the source replication snapshot number to determine if file system objects are associated with the pending replication job.

At block 1510, in one or more of the various embodiments, a recovery engine may be arranged to generate a recovery point based on the replication snapshot number associated with the replication snapshot on the source file system and the replication snapshot number associated with the replication snapshot on the target file system.

For example, in some embodiments, if the recovery engine successfully executes replication job 11, the changed file system objects in source file system replication snapshot 8 are copied to the target file system and associated with target file system replication snapshot 4 on the target file system. Accordingly, in this example, a recovery point, such as, recovery point 714 in FIG. 7 may be generated and stored on the source file system and the target file system.

Next, in one or more of the various embodiments, control may be returned to a calling process.

Figure 16:
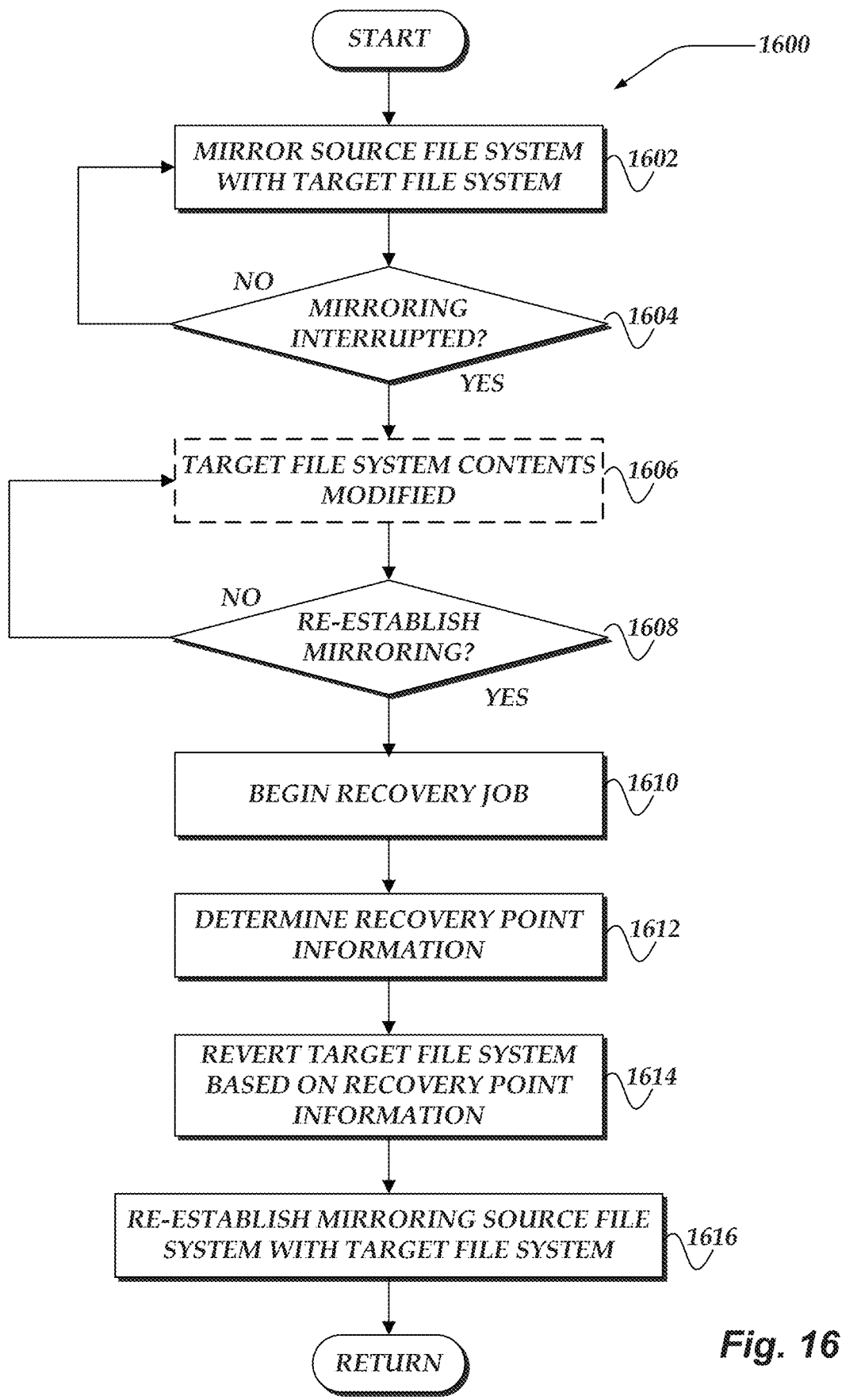
FIG. 16 illustrates a flowchart of a process for managing file system state during replication jobs in accordance with one or more of the various embodiments.

FIG. 16 illustrates a flowchart of process 1600 for managing file system state during replication jobs in accordance with one or more of the various embodiments. After a start block, at block 1602, in one or more of the various embodiments, a source file system may be arranged to be mirrored by a target file system. As described above, one file system may be arranged to mirror another file system. Accordingly, in some embodiments, the source file system may be considered to be in a mirroring relationship with a designated target file system. Thus, in some embodiments, a replication engine may be arranged to create replication snapshots on the source file system and copy the file system objects associated with the replication snapshot to the target file system. In some embodiments, the file system objects copied to the target file system may be associated with a replication snapshot on the target file system. In some embodiments, while the content of the two file systems may be mirrored, the snapshot numbers for each file system may run independently. For example, a source replication snapshot may be associated with snapshot number 5 on the source file system while the corresponding target replication snapshot may be associated with snapshot number 4 on the target file system.

In one or more of the various embodiments, various parameters associated with the mirroring relationship may be defined via configuration information. For example, the replication period may be set via configuration information to a value of once per hour, or the like. Other parameters may include defining one or more portions of the source file system to include in the mirroring relationship. For example, a portion of the source file system may be dedicated to temporary data that is deemed unsuitable for mirroring. Thus, for this example, configuration information may include setting, rules, or instructions that act to exclude a portion of the source file system from the mirroring relationship.

At decision block 1604, in one or more of the various embodiments, if the mirroring relationship may be interrupted, control may flow to block 1606; otherwise, control may loop back to block 1602. As discussed above, for various reasons, planned or unplanned interruptions of the mirroring relationship may occur.

At block 1606, in one or more of the various embodiments, optionally, one or more clients may modify contents of the target file system. As mentioned above, in some embodiments, while the mirroring relationship is operative, the target file system may be set to read-only to ensure that changes to the target file system may be limited to actions associated with replication jobs. However, in some embodiments, as a consequence of the interruption of the mirroring relationship, the target file system may modified, including being made writable. Accordingly, in one or more of the various embodiments, during the interruption of the mirroring relationship one or more file system clients (users or administrators) may modify the target file system.

Note, for some embodiments, this block is marked as optional because in some cases, clients may not modify the target file system during the interruption of the mirroring relationship.

At decision block 1608, in one or more of the various embodiments, if the mirroring relationship may be reestablished, control may flow to block 1610; otherwise, control may loop back to block 1606. At some time after being interrupted, the mirroring relationship may be reestablished. In some embodiments, the reestablishment of the mirroring relationship may be automatic or driven by administrator actions. For example, if the mirroring relationship is interrupted by a power failure that causes the mirroring to be interrupted, the source file system and target file system (or associated components) may automatically restart and restart the mirroring after power is restored.

Also, for example, in some embodiments, if the interruption was caused by planned maintenance, such as, replacing or upgrading networking equipment disposed between the source file system and the target file system, administrators may be enabled to restore the mirroring relationship after the planned maintenance is completed.

In one or more of the various embodiments, file system engines, recovery engines, or the like, may be arranged to monitor various metrics or services (e.g., watchdog processes) to determine if the conditions merit the restoration of the mirroring relationship. In some embodiments, rules or conditions for determining if the mirroring relationship should be restored may be determined from configuration information. Accordingly, in some embodiments, organizations may be enabled to tailor one or more of the conditions for restoring mirroring based on the needs of that organization.

At block 1610, in one or more of the various embodiments, a recovery engine may be arranged to initiate a recovery job. In one or more of the various embodiments, before mirroring can restart, a file system engine needs to ensure the current state of the target file system. In some embodiments, even though there has been an interruption in the mirroring relationship, often most of the file system objects on the target file system may be intact. Thus, in one or more of the various embodiments, a brute force full-copy of the contents of the source file system to the target file system may be unnecessary.

Accordingly, in one or more of the various embodiments, the recovery job may be arranged to restore the target file system to a known condition while avoiding unnecessary copying of file system objects from the source file system to the target file system.

At block 1612, in one or more of the various embodiments, the recovery engine may be arranged to determine recovery point information for the source file system and the target file system. In one or more of the various embodiments, each file system (source or target) may locally a copy of the recovery points for each completed replication job. Also, in some embodiments, a file system management platform may be arranged to store recovery point information, as well. In one or more of the various embodiments, recovery engines may be arranged to determine the location or access methods for the appropriate recovery point information based on paths, network addresses, security credentials, or the like, that may be obtained from configuration information.

As described above, the recovery point information may at least include replication snapshot numbers that correspond to completed replication jobs. Accordingly, in one or more of the various embodiments, the recovery engine may be arranged to determine the most recent replication snapshot number from the determined recovery point information.

At block 1614, in one or more of the various embodiments, the recovery engine may be arranged to revert contents of the target file system based on the recovery point information. In one or more of the various embodiments, the recovery engine may be arranged to employ the replication snapshot number to identify file system objects that may be associated with a completed replication job.

Accordingly, in some embodiments, as described above, the recovery engine may be arranged to traverse the target file system to identify file system objects associated with the current epoch of the target file system. As described above, the current epoch will be associated with an epoch number that is greater that snapshot numbers of previously completed snapshot. For example, if the current epoch value is 5 and the replication snapshot number is 4, file system objects associated with the current epoch value may be discarded to revert a target file system back to how it was at the completion of the last replication job. Accordingly, in one or more of the various embodiments, if the modifications associated with snapshot numbers (including the current epoch number) are greater than the replication snapshot number are reverted, the target file system may be considered to be in known mirror state such that it mirrors the contents of the source file system as of the source replication snapshot that is included in the recovery point information.

At block 1616, in one or more of the various embodiments, mirroring actions (e.g., replication jobs) may be performed to mirror the source file system on the target file system.

Next, in one or more of the various embodiments, control may be returned to a calling process.

Figure 17:
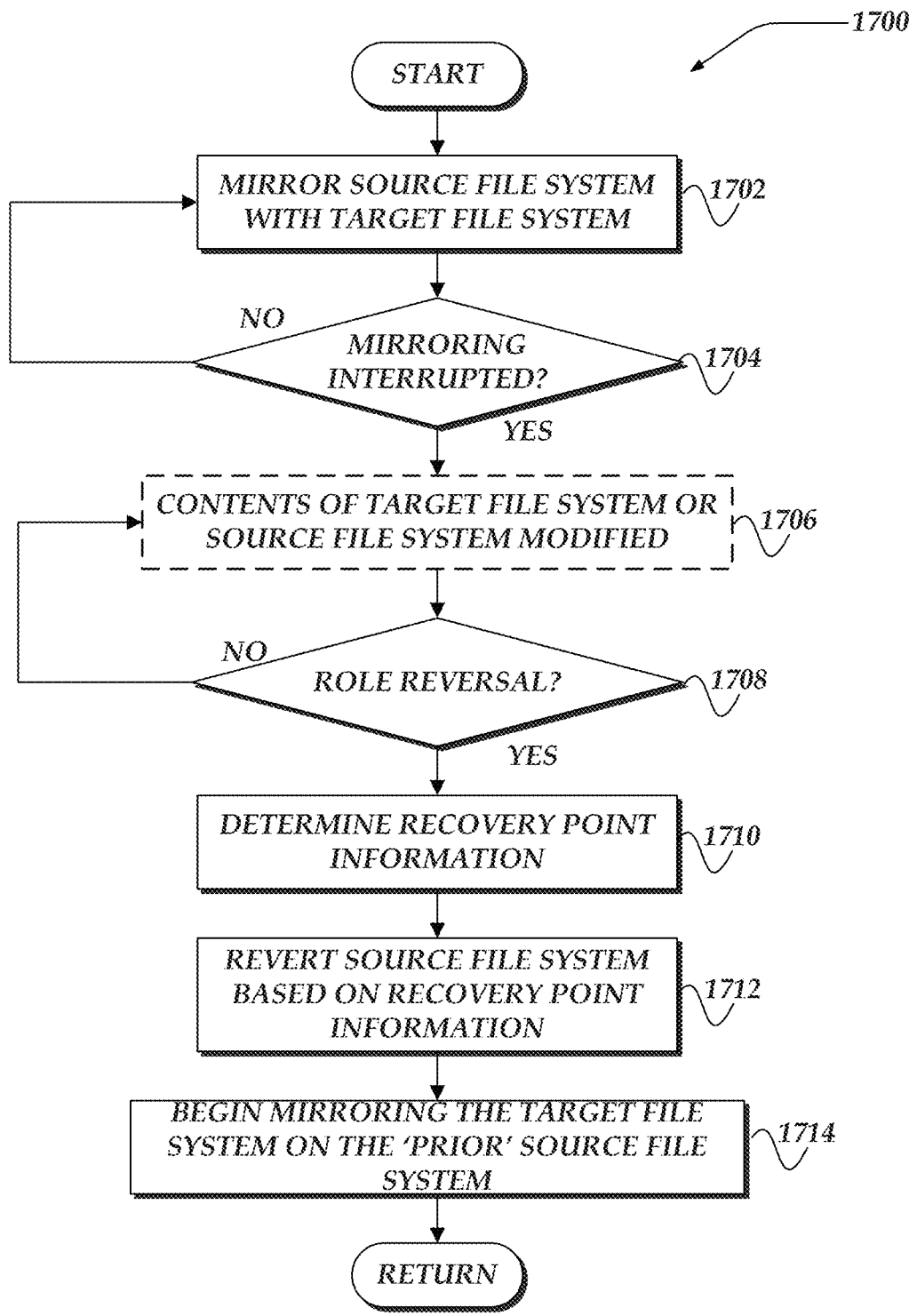
FIG. 17 illustrates a flowchart of a process for managing file system state during replication jobs in accordance with one or more of the various embodiments.

FIG. 17 illustrates a flowchart of process 1700 for managing file system state during replication jobs in accordance with one or more of the various embodiments. After a start block, at block 1702, in one or more of the various embodiments, a source file system may be arranged to be mirrored by a target file system.

At decision block 1704, in one or more of the various embodiments, if the mirroring relationship may be disrupted, control may flow to block 1706; otherwise, control may loop back to block 1702;

At block 1706, in one or more of the various embodiments, optionally, one or more clients may modify the contents of either the target file system or the source file system. As described above, whether the interruption in the mirroring relationship is planned or unplanned, either the source file system or the target file system may be modified via one or more clients. This may include writes, deletes, or the like.

At decision block 1708, in one or more of the various embodiments, if the roles of the source file system and target file system are reversed, control may flow to block 1710; otherwise, control may loop back block 1706. In one or more of the various embodiments, role reversal means that the file system that was the source file system is re-purposed as the target file system and the file system that was target file system is re-purposed as the source file system in a mirroring relationship.

Note, in this discussion the source file system will be consistently referred to as the source file system even though its role may be reversed such that it becomes the target file system in the reversed mirroring relationship. After role reversal, the source file system becomes the target file system and the target file system becomes the source file system. But for brevity and clarity herein the 'names' used to refer to each file system remain unchanged.

At block 1710, in one or more of the various embodiments, a recovery engine may be arranged to determine recovery point information. As described above, the recovery engine may be arranged to obtain the replication snapshot number of the source file system from the recovery point information. In one or more of the various embodiments, the replication snapshot number may be associated with a completed replication job that copied the replication snapshot from the source file system to the target file system.

At block 1712, in one or more of the various embodiments, the recovery engine may be arranged to revert contents of the source file system based on the recovery point information. In a role reversal scenario the source file system becomes the target file system and the previous target file system becomes the source file system. However, in one or more of the various embodiments, before a mirroring relationship can be established, the target file system in the mirroring relationship has to be reverted to a known condition based on the replication snapshot included in the recovery point.

Note, in the role reversal scenario the original target file system does not need to be reverted. In some embodiments, modifications made to the original target file system while the mirroring relationship is interrupted may be included in a subsequent replication snapshot that is copied to the new target file system (e.g., the original source file system) via a replication job.

At block 1714, in one or more of the various embodiments, a replication engine may begin to perform actions (e.g., replication jobs) to mirror the contents of the original target file system on the original source file system. Accordingly, in some embodiments, the original target file system becomes the new source file system and original source file system becomes the new target file system.

Next, in one or more of the various embodiments, control may be returned to a calling process.

Figure 18:
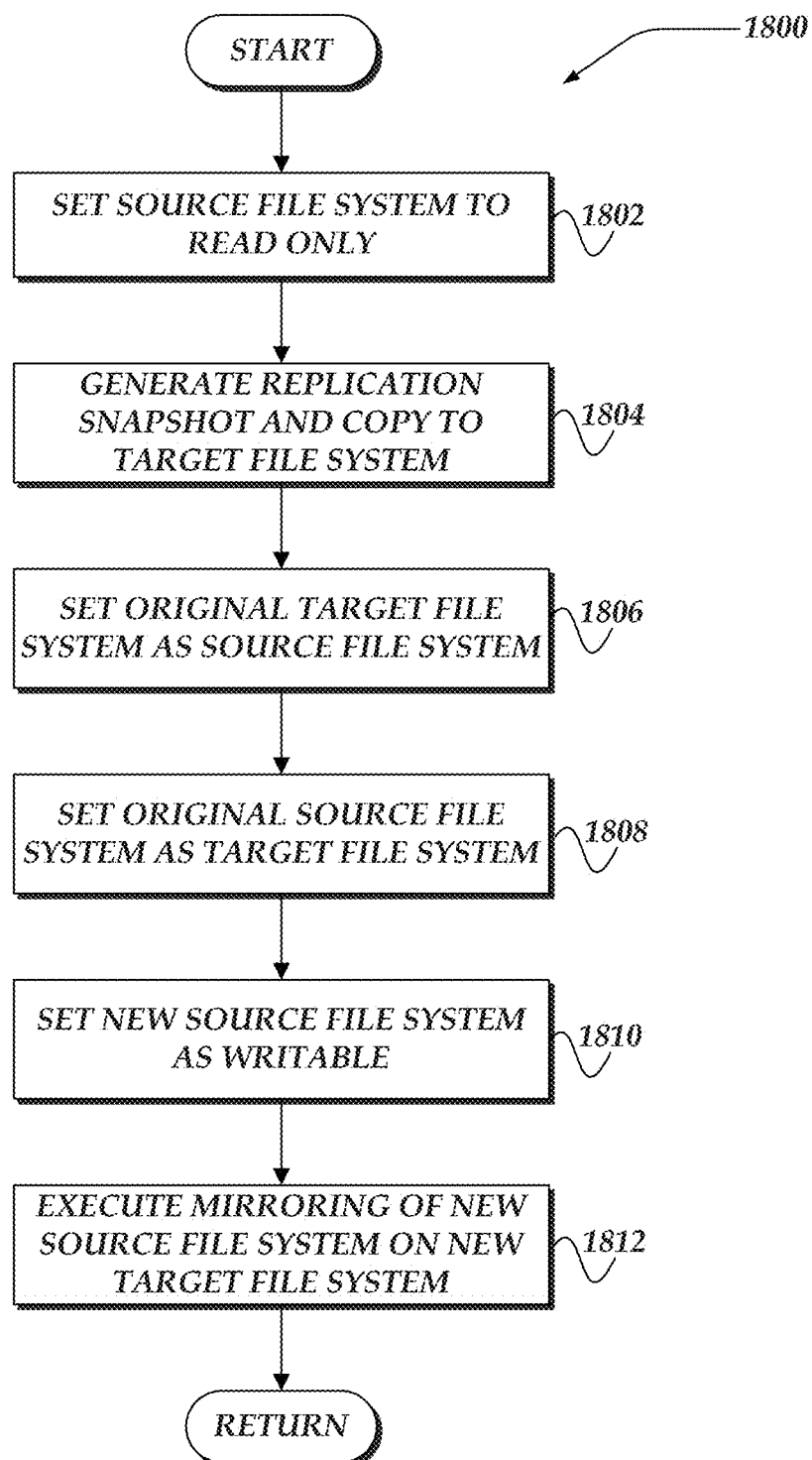
FIG. 18 illustrates a flowchart of a process for managing file system state during replication jobs in accordance with one or more of the various embodiments.

FIG. 18 illustrates a flowchart of process 1800 for managing file system state during replication jobs in accordance with one or more of the various embodiments. After a start block, at block 1802, in one or more of the various embodiments, a source file system may be configured to be read-only. In one or more of the various embodiments, file system engine may be arranged to set a file system as read-only by associating a current read-only identifier with the root of the file system. Accordingly, in one or more of the various embodiments, the file system engine may be arranged to set a current read-only identifier at the root of a file system to effectively mark the entire file system as read-only.

At block 1804, in one or more of the various embodiments, a file system engine may be arranged to generate a replication snapshot and copy the associated file system objects to the target file system. As described above, in some embodiments, reversing the roles of the source file system and target file system in a mirroring relationship may include executing one or more replication jobs to synchronized the contents of the source file system and the target file system. Accordingly, in one or more of the various embodiments, the file system engine may be arranged to generate replication snapshot and execute a replication job that may be based on the replication snapshot.

At block 1806, in one or more of the various embodiments, the file system engine may be arranged to configure the original target file system as the source file system in the mirroring relationship. In one or more of the various embodiments, if the necessary replication jobs may successfully complete, the file system engine may be arranged to configure the original target file system to be the new source file system.

At block 1808, in one or more of the various embodiments, the file system engine may be arranged to configure the original source file system as the target file system in the mirroring relationship. In one or more of the various embodiments, if the necessary replication jobs may successfully complete, the file system engine may be arranged to configure the original source file system to be the new target file system—reversing the mirroring relationship.

At block 1810, in one or more of the various embodiments, the file system engine may be arranged to configure the new source file system as writable. In one or more of the various embodiments, if the role reversal completed successfully, the new source file system may be enabled for writing to process write requests from one or more clients.

At block 1812, in one or more of the various embodiments, the file system engine may employ the replication engine to perform actions to enforce the mirroring relationship. As described above, in some embodiments, if the mirroring relationship is reestablished, period replication jobs may be executed to mirror the contents of the new source file system on the new target file system.

Next, in one or more of the various embodiments, control may be returned to a calling process.

Figure 19:
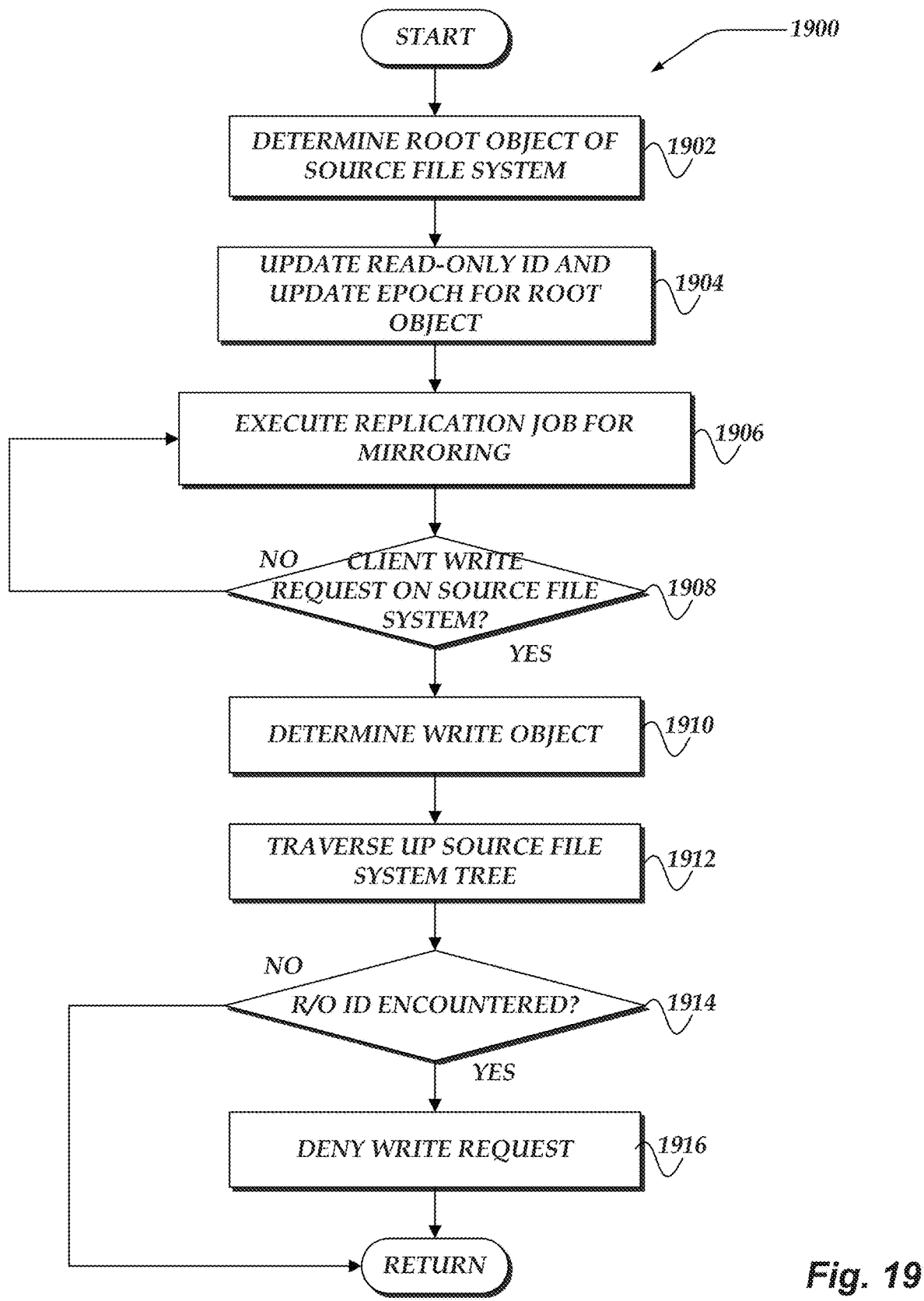
FIG. 19 illustrates a flowchart of a process for managing file system state during replication jobs in accordance with one or more of the various embodiments.

FIG. 19 illustrates a flowchart of process 1900 for managing file system state during replication jobs in accordance with one or more of the various embodiments. After a start block, at block 1902, in one or more of the various embodiments, the file system engine may be arranged to determine the root object of the original source file system. In one or more of the various embodiments, a root file system object may be considered to be the top node of a portion of the file system tree. Accordingly, in one or more of the various embodiments, in preparation for a role reversal replication job the file system engine may be arranged to determine the file system object that acts as the root of the file system.

At block 1904, in one or more of the various embodiments, the file system engine may be arranged to update the read-only identifier and the update epoch for the file system object associated with the root of the file system. In one or more of the various embodiments, the file system engine may be arranged to associate a current read-only identifier with the root file system object. Also, in some embodiments, because the status of the root file system object is being changed, the update epoch associated with the root file system object may be set to the current update epoch of the file system. Accordingly, in some embodiments, the root file system object may be considered associated with a current read-only identifier.

At block 1906, in one or more of the various embodiments, a replication engine may be arranged to execute a replication job that copies changes from the source file system to the target file system. In one or more of the various embodiments, in preparation for reversing the roles of a source file system and a target file system, a replication job may be executed to synchronize the contents of the source file system and the target file system before role reversal occurs.

At decision block 1908, in one or more of the various embodiments, if a client issues a write request directed to the source file system, control may flow to block 1910; otherwise, control may loop back to block 1906. In one or more of the various embodiments, even the source file system has been set to read-only mode, clients may continue to inadvertently or deliberately attempt to write to the file system.

At block 1910, in one or more of the various embodiments, the file system engine may be arranged to determine write object associated with the write request. In one or more of the various embodiments, file system engine may be arranged to lookup or retrieve the meta-data associated with the file system objects that may be associated with the write request. For example, in some embodiments, file system engine may be arranged to employ one or more indices, caches, or the like, to quickly lookup the meta-data for write objects that may be the target of the write request.

At block 1912, in one or more of the various embodiments, the file system engine may be arranged to traverse upwards in the source file system from the write object. As described above, in one or more of the various embodiments, the file system engine may be arranged to determine the parent file system objects of the write object based on the meta-data of the write object. Accordingly, in some embodiments, this information may be employed to determine the file system object that is the parent of the write object. For example, for some embodiments, if the write object is associated with a file, the parent file system object may be a file system object that represents a directory or folder in the file system. Likewise, in some embodiments, if the write object is a file system objects that represents a folder or directory, its parent file system object may be another directory or folder that includes the write object.

At decision block 1914, in one or more of the various embodiments, if a current read-only identifier is encountered during the upwards traverse, control may flow to block 1916; otherwise, control be returned to the calling process. For each file system object visited during the traversal, the file system engine may be arranged to determine if the file system object is associated with a current read-only identifier. As described above, for some embodiments, a current read-only identifier is a read-only identifier assigned to a file system object that is associated with an update epoch that is the same as the current update epoch of the file system.

At block 1916, in one or more of the various embodiments, the file system engine may be arranged to deny the write request because a current read-only identifier was discovered during the traversal the ancestors of the write object.

Next, in one or more of the various embodiments, control may be returned to a calling process.

Figure 20:
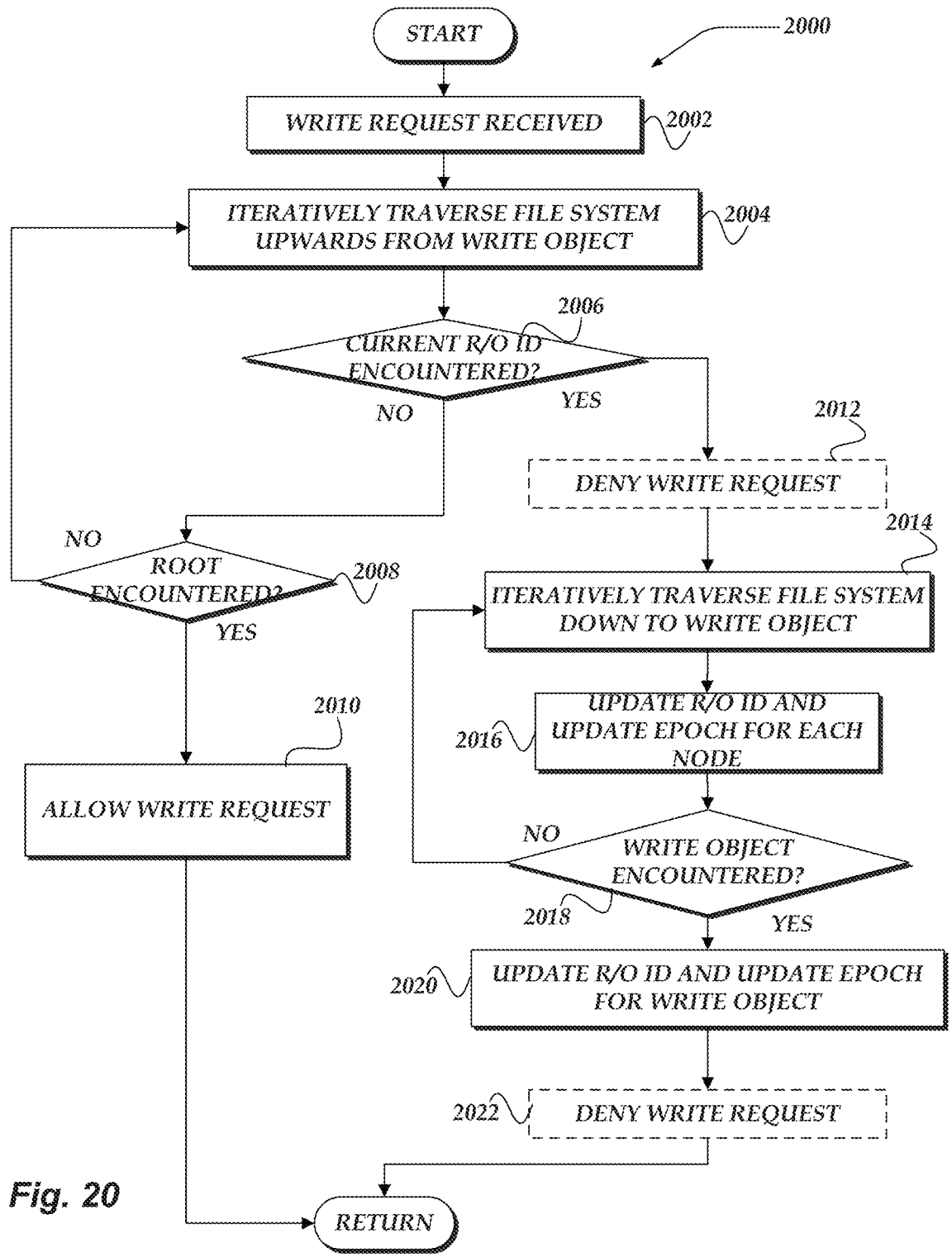
FIG. 20 illustrates a flowchart of a process for managing file system state during replication jobs in accordance with one or more of the various embodiments.

FIG. 20 illustrates a flowchart of process 2000 for managing file system state during replication jobs in accordance with one or more of the various embodiments. After a start block, at block 2002, in one or more of the various embodiments, the file system engine may be arranged to begin processing a write request. As described above, various clients of a file system may be enabled to submit file system commands, such as, read, writes, updates, or the like, via one or more file system interfaces or APIs. In some embodiments, write requests may be received even though a file system has been configured into read-only mode to support role reversal (e.g., flipping source file systems to become target file systems, or the like).

In one or more of the various embodiments, the write request may be arranged to include information that at least identifies the file system objects associated with the write. Accordingly, in some embodiments, these file system objects may be considered or described as write objects.

Note, one of ordinary skill in the art will appreciate the a write request could be a request to perform actions that may be modify the contents of a file system rather than being strictly limited to requests to write new data to the file system.

At block 2004, in one or more of the various embodiments, the file system engine may be arranged to iteratively traverse the file system upwards from the write object associated with the write request. In one or more of the various embodiments, the file system engine may be arranged to identify the folder or directory that includes the write objects that may be associated with the write requests. As described above, in some embodiments, folder or directories are file system objects that may be the parents of other file system objects.

In one or more of the various embodiments, the file system engine may be arranged to identify the parent file system object of the write objects. Further, in some embodiments, the file system engine may be arranged to begin walking up the spine of the file system tree. Accordingly, in some embodiments, at each iteration, the file system engine may be arranged to identify the parent of the current file system object. After visiting one parent file system object the file system engine may visit its parent file system object, and so on.

At decision block 2006, in one or more of the various embodiments, if a current read-only identifier is encountered, control may flow to block 2014; otherwise, control may flow to decision block 2008. In one or more of the various embodiments, the file system engine may be arranged to examine the meta-data associated with each file system object at it is visited.

As described above, each file system object may be associated with read-only identifier. In some embodiments, if a read-only identifier is current, the file system object may be considered to be configured to be read-only. Note, in some embodiments, a read-only identifier may be absent or have a nil/null value. In such cases, for some embodiments, file system objects may be treated the same as if they may be associated to a stale read-only identifier.

In one or more of the various embodiments, a read-only identifier may be considered current if update epoch associated with a file system object may be the same as the current update epoch of the file system. In one or more of the various embodiments, if a file system object has a read-only identifier and it is associated with a previous update epoch rather than the current update epoch for the file system, the read-only identifier may considered to be stale.

At decision block 2008, in one or more of the various embodiments, if the root of the file system may be encountered, control may flow to block 2010; otherwise, control may loop back to block 2004 to continue the upwards traversal. In one or more of the various embodiments, file system engines may be arranged to continue walking up the file system tree until the root of the file system may be encountered.

At block 2010, in one or more of the various embodiments, the file system engine may be arranged to allow the write request. In one or more of the various embodiments, since the root file system object has been visited and the read-only identifier examined and found to be absent or not current, the file system engine may be arranged to allow the write request to be processed. Note, in some embodiments, at this point, the write object and intervening parent file system objects have been examined to determine if they may be associated with a current read-only identifier. Accordingly, in some embodiments, because none of the parent file system objects or the write object may be associated with a current read-only identifier, the write request may be allowed.

Next, in one or more of the various embodiments, control may be returned to a calling process.

At block 2012, in one or more of the various embodiments, optionally, the file system engine may be arranged to deny the write request. As described above, in some embodiments, if a write object or one or more of its parent file system objects may be associated with a current read-only identifier, that file system object is considered read-only. Accordingly, in some embodiments, the file system engine may be arranged to deny the write request.

Note, this block is marked optional because in some embodiments the file system engine may be arranged to deny of the write request later on in the process.

At block 2014, in one or more of the various embodiments, the file system engine may be arranged to iteratively traverse downwards towards the write object. In one or more of the various embodiments, the file system engine may be arranged to traverse the file system tree back down to the write object. In some embodiments, this may be a low impact (e.g., low latency) operation because the meta-data associated with the visited parent file system objects may be stored locally or otherwise previously obtained during the upward direction traversal.

At block 2016, in one or more of the various embodiments, the file system engine may be arranged to update the read-only identifier and update epoch of the file system object encountered during the downward traversal. In one or more of the various embodiments, the read-only identifier may set to the current read-only identifier that was determined during the upwards traversal through the file system. In some embodiments, the update epoch value for each file system object visited during the downwards traversal may be set to the current update epoch of the file system.

At decision block 2018, in one or more of the various embodiments, if the write object associated with the write request is encountered, control may flow to block 2020; otherwise, control may flow back to block 2014.

At block 2020, in one or more of the various embodiments, the file system engine may be arranged to update the read-only identifier and update epoch for the write object that may be associated with the write request. In one or more of the various embodiments, the read-only identifier may set to the current read-only identifier that was determined during the upwards traversal through the file system. In some embodiments, the update epoch value for the write object may be set to the current update epoch of the file system.

At block 2022, in one or more of the various embodiments, optionally, the file system engine may be arranged to deny the write request. As described above, in some embodiments, if a write object or one or more of its parent file system objects may be associated with a current read-only identifier, that file system object is considered read-only. Accordingly, in some embodiments, the file system engine may be arranged to deny the write request.

Note, this block is marked optional because in some embodiments the file system engine may be arranged to deny of the write request later on in the process.

Next, in one or more of the various embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing data in a file system over a network using one or more processors that execute instructions to perform actions, comprising:
   providing a source file system that includes a plurality of objects;
   executing a replication job that copies each object associated with a source replication snapshot to a target file system, wherein the replication job is associated with a job identifier;
   generating recovery point information based on the replication job executing to completion, wherein the recovery point information includes the job identifier, a source snapshot number that corresponds to an ordering of the replication job executing to completion for the source replication snapshot stored on the source file system, and a copy of the recovery point information is generated that includes a target snapshot number that corresponds to a different ordering of the replication job executing to completion for a target replication snapshot stored on the target file system; and
   storing the recovery point information, wherein the recovery point information is stored on the source file system and the copy of the recovery point information is stored on the target file system, wherein the recovery point information and the source snapshot number is employed by the source file system or the copy of the recovery point information and the target snapshot number is employed by the target file system to recover from one or more errors detected for one or more of the source file system or the target file system during execution of a next replication job.

2. The method of claim 1, further comprising:
   executing the next replication job to copy one or more objects from the source file system to the target file system;
   in response to the one or more errors being associated with the target file system, aborting the next replication job; and
   in response to a resolution of the one or more errors associated with the target file system, performing further actions, including:
      providing the recovery point information based on a next job identifier associated with a previous replication job;
      determining a recovery source snapshot number based on the source snapshot number included in the recovery point information;
      determining a recovery target snapshot number based on the target snapshot number included in the recovery point information;
      determining one or more recovery objects based on the recovery source snapshot number and the recovery target snapshot number; and
      copying the one or more recovery objects from the source file system to the target file system.

3. The method of claim 1, further comprising,
   generating a snapshot number that is associated an epoch of the source file system;
   associating each object of the plurality of object that is modified during the epoch with the snapshot number; and
   employing the snapshot number to provide the source replication snapshot.

4. The method of claim 1, further comprising:
   generating a snapshot number that is associated an epoch of the target file system;
   employing the snapshot number to provide the source replication snapshot;
   associating each object that is copied to the target file system with the snapshot number; and
   employing the snapshot number to provide the target replication snapshot.

5. The method of claim 1, further comprising, generating the source replication snapshot based on another snapshot that is on the source file system, wherein a snapshot number associated with the other snapshot is employed as a source replication snapshot number.

6. A system for managing data in a file system comprising:
   a network computer, comprising:
      a transceiver that communicates over the network;
      a memory that stores at least instructions; and
      one or more processors that execute instructions that perform actions, including:
         providing a source file system that includes a plurality of objects;
         executing a replication job that copies each object associated with a source replication snapshot to a target file system, wherein the replication job is associated with a job identifier;
         generating recovery point information based on the replication job executing to completion, wherein the recovery point information includes the job identifier, a source snapshot number that corresponds to an ordering of the replication job executing to completion for the source replication snapshot stored on the source file system, and a copy of the recovery point information is generated that includes a target snapshot number that corresponds to a different ordering of the replication job executing to completion for a target replication snapshot stored on the target file system; and
         storing the recovery point information, wherein the recovery point information is stored on the source file system and the copy of the recovery point information is stored on the target file system, wherein the recovery point information and the source snapshot number is employed by the source file system or the copy of the recovery point information and the target snapshot number is employed by the target file system to recover from one or more errors detected for one or more of the source file system or the target file system during execution of a next replication job; and a client computer, comprising:
a transceiver that communicates over the network;
a memory that stores at least instructions; and
one or more processors that execute instructions that perform actions, including, providing one or more of the plurality of objects.

7. The system of claim 6, further comprising:
executing the next replication job to copy one or more objects from the source file system to the target file system;
in response to the one or more errors being associated with the target file system, aborting the next replication job; and
in response to a resolution of the one or more errors associated with the target file system, performing further actions, including:
providing the recovery point information based on a next job identifier associated with a previous replication job;
determining a recovery source snapshot number based on the source snapshot number included in the recovery point information;
determining a recovery target snapshot number based on the target snapshot number included in the recovery point information;
determining one or more recovery objects based on the recovery source snapshot number and the recovery target snapshot number; and
copying the one or more recovery objects from the source file system to the target file system.

8. The system of claim 6, further comprising,
generating a snapshot number that is associated an epoch of the source file system;
associating each object of the plurality of object that is modified during the epoch with the snapshot number; and
employing the snapshot number to provide the source replication snapshot.

9. The system of claim 6, further comprising:
generating a snapshot number that is associated an epoch of the target file system;
employing the snapshot number to provide the source replication snapshot;
associating each object that is copied to the target file system with the snapshot number; and
employing the snapshot number to provide the target replication snapshot.

10. The system of claim 6, further comprising, generating the source replication snapshot based on another snapshot that is on the source file system, wherein a snapshot number associated with the other snapshot is employed as a source replication snapshot number.

11. A processor readable non-transitory storage media that includes instructions for managing data in a file system over a network, wherein execution of the instructions by one or more processors on one or more network computers performs actions, comprising:
providing a source file system that includes a plurality of objects;
executing a replication job that copies each object associated with a source replication snapshot to a target file system, wherein the replication job is associated with a job identifier;
generating recovery point information based on the replication job executing to completion, wherein the recovery point information includes the job identifier, a source snapshot number that corresponds to an ordering of the replication job executing to completion for the source replication snapshot stored on the source file system, and a copy of the recovery point information is generated that includes a target snapshot number that corresponds to a different ordering of the replication job executing to completion for a target replication snapshot stored on the target file system; and
storing the recovery point information, wherein the recovery point information is stored on the source file system and the copy of the recovery point information is stored on the target file system, wherein the recovery point information and the source snapshot number is employed by the source file system or the copy of the recovery point information and the target snapshot number is employed by the target file system to recover from one or more errors detected for one or more of the source file system or the target file system during execution of a next replication job.

12. The media of claim 11, wherein the one or more network computer processors execute instructions that perform actions, further comprising:
executing the next replication job to copy one or more objects from the source file system to the target file system;
in response to the one or more errors being associated with the target file system, aborting the next replication job; and
in response to a resolution of the one or more errors associated with the target file system, performing further actions, including:
providing the recovery point information based on a next job identifier associated with a previous replication job;
determining a recovery source snapshot number based on the source snapshot number included in the recovery point information;
determining a recovery target snapshot number based on the target snapshot number included in the recovery point information;
determining one or more recovery objects based on the recovery source snapshot number and the recovery target snapshot number; and
copying the one or more recovery objects from the source file system to the target file system.

13. The media of claim 11, wherein the one or more network computer processors execute instructions that perform actions, further comprising,
generating a snapshot number that is associated an epoch of the source file system;
associating each object of the plurality of object that is modified during the epoch with the snapshot number; and
employing the snapshot number to provide the source replication snapshot.

14. The media of claim 11, wherein the one or more network computer processors execute instructions that perform actions, further comprising:
generating a snapshot number that is associated an epoch of the target file system;
employing the snapshot number to provide the source replication snapshot;
associating each object that is copied to the target file system with the snapshot number; and
employing the snapshot number to provide the target replication snapshot.

15. The media of claim 11, wherein the one or more network computer processors execute instructions that perform actions, further comprising, generating the source replication snapshot based on another snapshot that is on the source file system, wherein a snapshot number associated with the other snapshot is employed as a source replication snapshot number.

16. A network computer for managing data in a file system, comprising:
a transceiver that communicates over the network;
a memory that stores at least instructions; and
one or more processors that execute instructions that perform actions, including:
providing a source file system that includes a plurality of objects;
executing a replication job that copies each object associated with a source replication snapshot to a target file system, wherein the replication job is associated with a job identifier;
generating recovery point information based on the replication job executing to completion, wherein the recovery point information includes the job identifier, a source snapshot number that corresponds to an ordering of the replication job executing to completion for the source replication snapshot stored on the source file system, and a copy of the recovery point information is generated that includes a target snapshot number that corresponds to a different ordering of the replication job executing to completion for a target replication snapshot stored on the target file system; and
storing the recovery point information, wherein the recovery point information is stored on the source file system and the copy of the recovery point information is stored on the target file system, wherein the recovery point information and the source snapshot number is employed by the source file system or the copy of the recovery point information and the target snapshot number is employed by the target file system to recover from one or more errors detected for one or more of the source file system or the target file system during execution of a next replication job.

17. The network computer of claim 16, wherein the one or more processors execute instructions that perform actions, further comprising:
executing the next replication job to copy one or more objects from the source file system to the target file system;
in response to the one or more errors being associated with the target file system, aborting the next replication job; and
in response to a resolution of the one or more errors associated with the target file system, performing further actions, including:
providing the recovery point information based on a next job identifier associated with a previous replication job;
determining a recovery source snapshot number based on the source snapshot number included in the recovery point information;
determining a recovery target snapshot number based on the target snapshot number included in the recovery point information;
determining one or more recovery objects based on the recovery source snapshot number and the recovery target snapshot number; and
copying the one or more recovery objects from the source file system to the target file system.

18. The network computer of claim 16, wherein the one or more processors execute instructions that perform actions, further comprising,
generating a snapshot number that is associated an epoch of the source file system;
associating each object of the plurality of object that is modified during the epoch with the snapshot number; and
employing the snapshot number to provide the source replication snapshot.

19. The network computer of claim 16, wherein the one or more processors execute instructions that perform actions, further comprising:
generating a snapshot number that is associated an epoch of the target file system;
employing the snapshot number to provide the source replication snapshot;
associating each object that is copied to the target file system with the snapshot number; and
employing the snapshot number to provide the target replication snapshot.

20. The network computer of claim 16, wherein the one or more processors execute instructions that perform actions, further comprising, generating the source replication snapshot based on another snapshot that is on the source file system, wherein a snapshot number associated with the other snapshot is employed as a source replication snapshot number.

* * * * *